(12) United States Patent
Hou

(10) Patent No.: US 7,048,106 B2
(45) Date of Patent: May 23, 2006

(54) POWER TAKE-OFF CONTROL SYSTEM AND METHOD

(75) Inventor: Yanming Hou, Pleasant Prairie, WI (US)

(73) Assignee: CNH America LLC, New Holland, PA (US)

(*) Notice: Subject to any disclaimer, the term of this patent is extended or adjusted under 35 U.S.C. 154(b) by 79 days.

(21) Appl. No.: 10/810,781

(22) Filed: Mar. 26, 2004

(65) Prior Publication Data

US 2005/0211528 A1    Sep. 29, 2005

(51) Int. Cl.
*F16H 37/00* (2006.01)

(52) U.S. Cl. .................... 192/103 F; 74/11; 701/68
(58) Field of Classification Search .............. None
See application file for complete search history.

(56) References Cited

U.S. PATENT DOCUMENTS

| | | | |
|---|---|---|---|
| 4,458,471 A | 7/1984 | Herwig | 56/10.2 |
| 4,760,902 A | 8/1988 | Bellanger | 192/0.33 |
| 5,251,132 A | 10/1993 | Bulgrien | 364/424.1 |
| 5,310,974 A | 5/1994 | Churchill et al. | 200/566 |
| 5,337,868 A * | 8/1994 | Liu et al. | 477/74 |
| 5,393,274 A * | 2/1995 | Smedley | 477/74 |
| 5,454,767 A | 10/1995 | Clausen et al. | 477/32 |
| 5,494,142 A | 2/1996 | Kale | 192/12 C |
| 5,513,734 A | 5/1996 | Scotti | 192/70.27 |
| 5,549,185 A | 8/1996 | Kale | 192/12 C |
| 5,562,173 A | 10/1996 | Olson | 180/53.4 |
| 5,601,172 A | 2/1997 | Kale et al. | 192/85 R |
| 5,624,350 A * | 4/1997 | Bates | 477/180 |
| 5,778,329 A | 7/1998 | Officer et al. | 701/55 |
| 5,806,640 A | 9/1998 | Kale | 192/12 C |
| 6,080,081 A | 6/2000 | Sauermann et al. | 477/79 |
| 6,205,385 B1 | 3/2001 | Stelzle et al. | 701/50 |
| 6,253,140 B1 * | 6/2001 | Jain et al. | 701/67 |
| 6,267,189 B1 | 7/2001 | Nielsen et al. | 180/53.1 |
| 6,517,465 B1 | 2/2003 | Hrazdera | 477/174 |
| 6,554,742 B1 | 4/2003 | Milender et al. | 477/155 |

* cited by examiner

*Primary Examiner*—Rodney H. Bonck
(74) *Attorney, Agent, or Firm*—Stephen A. Bucchianeri; John William Stader; Michael G. Harms

(57) ABSTRACT

A PTO control system and method for engaging a PTO clutch of a vehicle or work machine such as, but not limited to, an agricultural tractor, that can effectively utilize both engine speed and PTO output speed values for determining a predicted and/or actual PTO load and other variable conditions which can effect engagement, and which can responsively calibrate the system for engagement under the load and other conditions and adaptively control applied acceleration and torque during the engagement.

19 Claims, 13 Drawing Sheets

POWER TAKE-OFF CONTROL SYSTEM AND METHOD

TECHNICAL FIELD

The present invention relates to a power take-off (PTO) control system and method for engaging a PTO clutch of a vehicle or work machine such as, but not limited to, an agricultural tractor, and more particularly, to a PTO control system that can effectively utilize both engine speed and PTO output speed values for determining a predicted and/or actual PTO load and other variable conditions which can effect engagement, and which can responsively calibrate the system for engagement under the load and other conditions and adaptively control applied acceleration and torque during the engagement.

BACKGROUND ART

PTOs have long been used on many types of vehicles and work machines, including on agricultural vehicles such as combines and tractors, to provide power for equipment or implements, such as, for agricultural purposes, mowers, balers, forage harvesters and spreaders. Hereinafter, for the present purposes the terms vehicle and work machine are considered the same and are used interchangeably. PTOs are typically selectably connectable to a source of rotational power such as an engine of the vehicle by a clutch, such as an electrical or fluid controlled clutch, controlled by a clutch control system. Many known PTO clutch control systems have been developed over the years, and have operated under a variety of control strategies designed to provide desired features such as smooth engagement and to protect PTO shafts from catastrophic failure and attached equipment during the clutch engagement from damage.

Typical of such known systems is the system of U.S. Pat. No. 5,494,142, which discloses a PTO control system for vehicles, such as farm tractors including a PTO shaft, for supplying rotational motion to an implement of the type which may be stationary or towed by the tractor. Power is transferred to the PTO shaft by a clutch including an input shaft coupled to a power source and an output shaft coupled to the PTO shaft. The clutch transmits a maximum torque between the input and output shafts in response to a maximum clutch pressure and transmits a variable torque between the input and output shafts in response to a given clutch engagement pressure that is less than the maximum clutch engagement pressure.

Such control system includes a clutch control for engaging and disengaging the clutch in response to first and second control signals, respectively, and transmits a variable torque between the input and output shafts dependent upon a given clutch engagement pressure defined by the first control signals. The clutch engagement pressure is less than the maximum engagement pressure to limit the torque transfer between the input and output shafts by the clutch. The control system also includes a first transducer disposed to generate an input signal representative of the rotational speed of the input shaft, a second transducer disposed to generate an output signal representative of the rotational speed of the output shaft, and a control circuit. The control circuit is coupled to the clutch control, the first transducer, and the second transducer.

While such a control system has been of great value and effectiveness, it and other known control systems have continued to experience difficulties when attempts are made to drive loads with the PTO which are extremely light or heavy. With such systems, one shortcoming is that no differentiation is made with respect to the loads applied, be they very light or very heavy. With a light applied load, initial PTO shaft movement could occur at a relatively early time and modulation could be achieved over a relatively longer time period than necessary. With a heavy load, however, initial PTO shaft movement would not occur until a later time, leaving much less time for modulation.

Also reference U.S. Pat. No. 6,267,189, which discloses another known method for controlling engagement of a PTO clutch. In this method, during engagement of the PTO, a control circuit continuously determines an actual acceleration of the PTO based upon the output shaft velocity, and generates control signals using a desired acceleration and the actual acceleration. The control circuit may continuously determine the desired acceleration based upon the input speed signal. Alternatively, the control circuit may provide control signals to cause the torque transmitted through the clutch to increase at a rate depending upon the difference between the desired and actual accelerations when the actual acceleration is more than a threshold proportion of the desired acceleration, and to cause the torque to increase at a rate independent of the difference when the actual acceleration is less than the threshold proportion.

Additionally, the system of U.S. Pat. No. 6,267,189 may make adjustments that can adversely effect smooth clutch engagement. For instance, under some heavy loading conditions, the resulting applied torque can result in substantial engine droop, but no, or very little, rotation or acceleration of the PTO output shaft. Under such conditions, a problem that can occur is that the system may categorize the actual acceleration as below the threshold value, and proceed to cause the torque to increase at a faster rate, possibly resulting in problems such as rough engagement, engine stalling, and/or increased component wear and/or damage, due to the high torque conditions.

Thus, what is sought is a PTO control system which overcomes one or more of the problems and shortcomings set forth above.

SUMMARY OF THE INVENTION

The present invention is directed to an improved system and method for controlling operation or engagement of a clutch for connecting a PTO of a vehicle in rotatably driven relation to a rotating power source of the vehicle, such as an engine or transmission output, for overcoming one or more of the problems and shortcomings set forth above. According to one aspect of the invention, the system includes a controller for controlling an engagement pressure of the clutch, the clutch including an input coupled directly or indirectly to the power source and an output coupled to the PTO, wherein the clutch will transmit a maximum torque between the input and output in response to a maximum clutch engagement pressure as controlled by the controller, and will transmit a range of torque values between zero and the maximum torque in response to a range of clutch engagement pressures less than the maximum clutch engagement pressure and a load condition on the PTO. Generally, the pressure will be increased at one or a succession of rates from a starting value, to a higher value at which the clutch will transmit a desired level of torque which can be the maximum or some lesser torque. The clutch can be, for instance, a fluid or hydraulic clutch, and can include a valve such as a proportional clutch control valve for controlling delivery of pressurized fluid to the clutch for varying the clutch pressure. The valve can be operated or controlled, for instance, by a control signal which can be a variable electrical current value, voltage value, a digital signal value, or the like. As an alternative, the valve can be pulse width modulated so as to be capable of opening for varying periods for controlling clutch pressure. The system includes sensors for sensing a rotational speed representative of a rotational speed of the power source and of a rotational speed of the output, respectively, and outputting speed signals representative of the sensed speeds to a processor of the controller. The controller includes a processor and is operable for storing and retrieving information in a memory and for outputting control signals to the valve for controlling the clutch engagement pressure, for instance by varying electrical current or voltage, responsive to the speed signals and information contained in the memory, using an appropriate algorithm or operating strategy.

Generally, during operation the controller will initiate clutch engagement by outputting a starting control signal or current value sufficient to cause the valve to begin increasing clutch pressure in a fill mode. This may be preceded by a short duration greater opening of the valve, known as a valve wake up. From the starting signal or current value, the controller will gradually increase the signal or current value during the fill mode such that the clutch will begin carrying torque, and thereafter increase the signal or current value such that the PTO output will begin to be rotated. Then, in a modulation mode the controller will continue to increase the signal or current value, perhaps at a different rate or rates, which can be a higher rate, and which rate can change, such that the output will be accelerated so as to rotate at the same speed as the input, which occurrence is known as lock-up. Subsequently, if the signal value or current at which the clutch locks up is not the maximum, the signals will typically be increased at an even faster rate to the maximum signal or current value in a ramp mode.

As noted above, it has been found that the loading condition on the PTO can have a significant impact on the smoothness of the clutch engagement and the load on the drive train and power source. Clutch wear, fluid temperature, and fluid system pressure are also factors in the smoothness of the engagement. Generally, as one problem, as a result of any combination of the above factors, if the starting control signal or current value for initiating engagement is too high and/or the subsequent control signals during the fill mode and/or the modulation mode are increased too rapidly for an actual loading condition on the PTO, the engagement can be rougher and/or the rotational speed of the power source or engine can be decreased or droop to an undesirable extent, and even stall. These are undesirable occurrences as they can cause problems including premature or increased wear on the clutch and other drive line components and even damage. If the starting signal or current value is too low and/or the subsequent signal values during the fill mode and modulation mode are increased too slowly for an actual loading condition on the PTO, then the engagement will likely be smooth, but the clutch will likely lock-up later than would be necessary. Similarly, if the starting signal or current value is lower or higher than desirable for a given load condition or combination of the above factors, the later in time during the engagement process at which determination of the existence of the condition and correction or compensation is made, the shorter the time available for implementing the correction or compensation.

To avoid or reduce the influence or impact of factors such as those set forth above, including load conditions, clutch wear, fluid temperature and fluid system pressure, and/or to adapt to or compensate or correct for such conditions, the controller will determine the starting value for the control signal or current for commencing to fill the clutch based at least in part on information stored in the memory relating to or derived from or determined during at least one previous engagement, particularly during the fill mode thereof. For an initial engagement wherein no or inadequate information relating to previous engagements exist, such as for the first engagement of the cluthc after the vehicle leaves the factory, a factory set or default starting value can be used. More preferably relating to subsequent engagements, the information used for the determination will include the initial control signal or current value from at least one previous engagement at which the clutch began to carry torque, or a derivative thereof. The information is preferably determined or sensed from the occurrence of the first of two conditions, including a drop or droop in the rotational speed of the power source, and the beginning of rotation of the PTO output, if any. This information can be determined, sensed, or collected for any desired or required number of previous engagements, and can be processed, as required or desired for determining the starting control signal or current value for the next engagement.

According to one preferred aspect of the invention, the information from four previous engagements can be averaged and used as a reference for determining the starting control signal or current value for the next engagement.

According to another preferred aspect, if the information from the most previous engagement is beyond a predetermined range, or differs by more than a predetermined amount or in some predetermined manner from the information from the prior engagements, just the information from the last engagement can be used as the reference for determining the starting control signal or current value for the next engagement, or just the information from the previous engagements can be used.

With regard to the present engagement, the information used for determining the starting value can also be utilized for approximating loading and the other factors or conditions presently affecting the clutch, for adjusting the rate or rates of increase in the clutch pressure.

Thus, the determined information can serve several functions including, but not limited to, as an indicator or reference of loading and other conditions and factors affecting engagement of the clutch; that a selected starting control signal value is or is not appropriate for the present conditions; and as a factor for determining a starting signal or current value for subsequent engagements of the clutch.

DETAILED DESCRIPTION OF THE INVENTION

Figure 1:
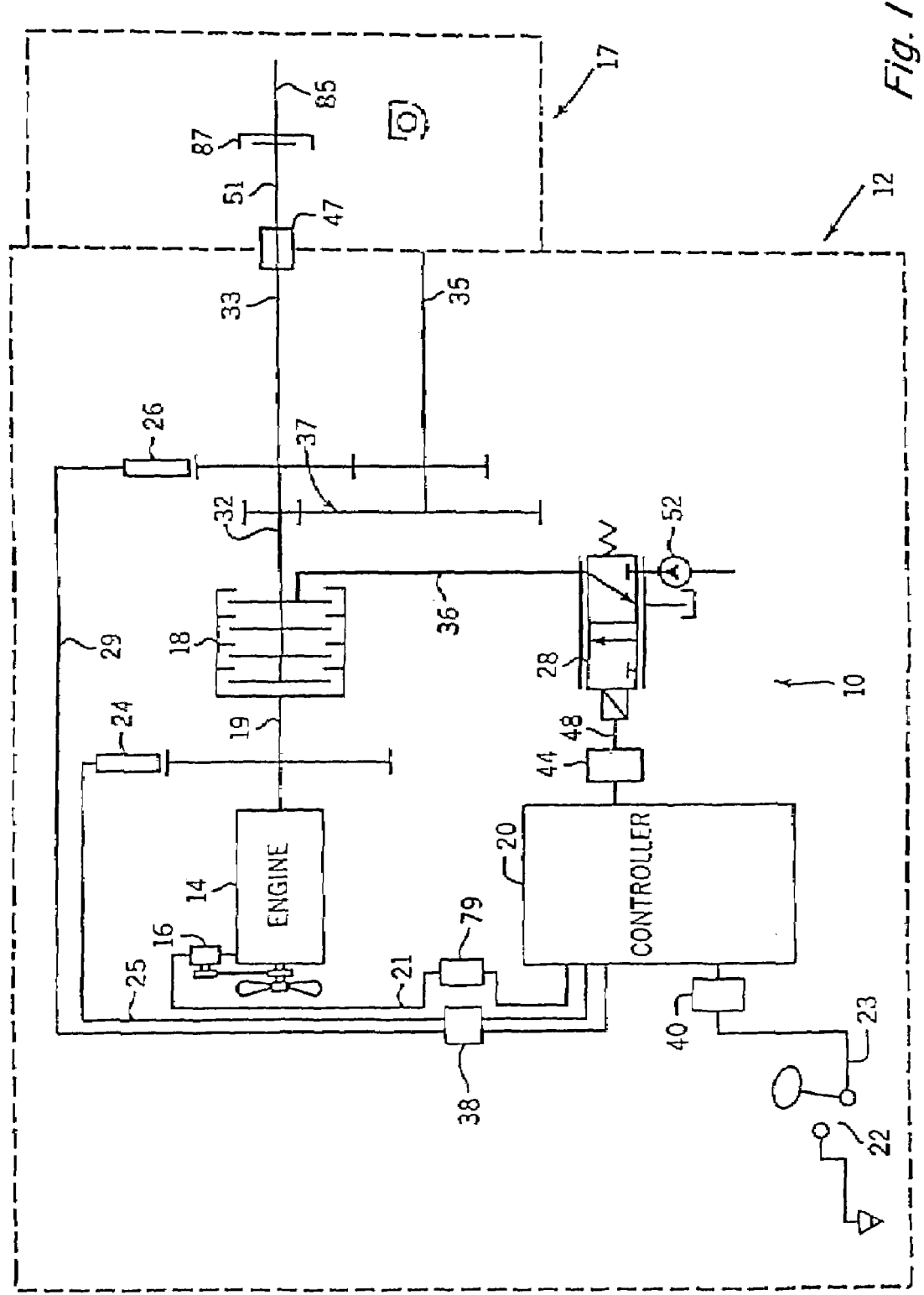
FIG. 1 is a schematic block diagram of a PTO drive and control system.

FIG. 1 depicts an embodiment of a power take-off (PTO) clutch and brake control system 10 for a representative work machine or vehicle, represented by an agricultural vehicle (such as a tractor schematically represented by the dashed line labeled 12) that includes, and is operable according to steps of, the present invention. With the exception of the PTO clutch control system 10, tractor 12 may be a conventional agricultural tractor of the type including a power source which is preferably an engine 14 having conventional accessories such as an alternator 16. Engine 14, in addition to providing power to the drive wheels (not shown) of tractor 12, provides the power to apply rotational motion to a multi-plate hydraulically actuated PTO clutch 18. Depending upon whether PTO clutch 18 is engaged, power from engine 14 may in turn be transmitted to an output shaft 32. Output shaft 32 is shown directly coupled to a 1000 RPM PTO (high speed PTO) shaft 33 and also is shown coupled to a 540 RPM PTO (low speed PTO) shaft 35 by a reduction gear 37. In alternative embodiments, high speed PTO shaft 33 may be of another speed rating such as 750 RPM. While, in alternate embodiments, high and low speed PTO shafts 33 and 35 may be provided at separate output terminals on tractor 12, preferably each PTO will be employed at a single output terminal (one PTO may be substituted for the other).

Control system 10 includes a controller 20 (including, e.g., a digital microprocessor such as the Intel TN83C51FA), a PTO on/off switch 22, an output clutch speed transducer 26, and a normally closed, solenoid operated, hydraulic, proportional clutch control valve 28. Control system 10 also is coupled to alternator 16 and receives a signal therefrom representing the speed of engine 14.

The engine speed is equal to or, depending upon gear reduction, a multiple or proportion of the speed of an input shaft 19 to PTO clutch 18 that receives power from engine 14 and transmits power to the clutch. In alternate embodiments, a signal representative of the speed of input shaft 19 (that is directly representative of the speed of engine 14) may be obtained by way of an input shaft transducer 24 coupled to shaft 19 instead of alternator 16. Consequently, for purposes of this document, reference may interchangeably be made to the engine and/or its speed or to the input shaft and/or its speed, with like effect, and treating the speeds as being alike although they may differ proportionally.

Transducers 24 and 26 may, by way of example and not of limitation, be variable reluctance sensors.

Alternator 16 and transducer 26 are coupled to digital inputs of controller 20 by, respectively, electrical conductors 21 and 29 and conditioning circuits 79 and 38, which may be integral to controller 20. (In alternative embodiments in which signals regarding input shaft 19 are provided by transducer 24, an electrical conductor 25 along with conditioning circuit 38 may be employed.) Conditioning circuits 79 and 38 filter radio and other undesirable frequencies of interference from the signals produced by alternator 16 and transducer 26 (or, in alternate embodiments, transducer 24) and introduced in conductors 21 and 29 (or, in alternate embodiments, conductor 25). Additionally, conditioning circuits 79 and 38 typically place the signals produced by alternator 16 and transducer 26 (or transducer 24) within a 5 V range and typically provide these signals with a generally square wave configuration which can be appropriately sampled by controller 20. Accordingly, the signals applied to controller 20 by alternator 16 (or transducer 24) and transducer 26 typically have a generally square wave configuration with a frequency proportional to the rotational speed of input shaft 19 (or of engine 14) and output shaft 32, respectively.

Switch 22 has associated therewith a conditioning circuit 40, which may be integral to controller 20. Depending upon the application, circuit 40 may provide signal inversion and appropriate filtering to eliminate switch bounce. However, depending upon the type of controller 20 used, circuit 40 may be eliminated. The signal produced by switch 22 is applied to a digital input of controller 20 via electrical conductor 23.

Hydraulic valve 28 is coupled to a digital output of controller 20 by an appropriate amplification and signal conditioning circuit 44, which may be integral to controller 20, and electrical conductor 48. As will be discussed in greater detail below, controller 20 applies a signal, such as an analog or a pulse-width modulated (PWM) signal, to valve 28 via electrical conductor 48 and circuit 44. Due to the nature of the solenoid that operates valve 28, amplification and isolation circuit 44 is utilized to produce a control signal having sufficient voltage and current to operate valve 28. Additionally, due to inductive kickbacks which may potentially be produced by the solenoids of valve 28, isolation may be provided in circuit 44 to protect controller 20. While controller 20 is typically configured to apply an analog current signal to valve 28, in alternative embodiments an analog voltage signal, a pulse-width modulated (PWM) current signal, or a PWM voltage signal can be similarly employed and provided to valve 28. In each case, the magnitude of the signal provided (which, in the case of a PWM current or voltage signal, is the time-average magnitude of the signal and therefore depends upon the duty cycle or pulse width of the signal) is proportional to the desired pressure from valve 28.

Turning to the operation of valve 28, valve 28 is a proportional hydraulic valve which applies hydraulic fluid to PTO clutch 18 from the system hydraulic fluid source 52 at a pressure which is related to (e.g. proportional to) the time-averaged voltage applied to the solenoid associated with valve 28. Thus, the pressure of the fluid applied to PTO clutch 18 via hydraulic conduit 36 by valve 28 may be controlled by applying a variable current signal to valve 28. In alternate embodiments, the pressure may be controlled by applying a variable voltage signal, a PWM current signal, or PWM voltage signal to valve 28. Where a PWM signal is applied to the solenoid of valve 28 to control the pressure of the hydraulic fluid applied to PTO clutch 18, the pressure of the fluid is proportional to the pulse width of the PWM signal produced by controller 20.

As discussed above, PTO clutch 18 is a multi-plate hydraulic clutch. This type of clutch is capable of transferring a torque from clutch input shaft 19 to output shaft 32, where the torque is generally proportional to the pressure of the hydraulic fluid applied to PTO clutch 18. Output shaft 32 is shown directly coupled to 1000 RPM PTO (high speed PTO) 33 and also is shown coupled to 540 RPM PTO (low speed PTO) 35 by reduction gear 37. In alternative embodiments, high speed PTO 33 may be of another speed rating, such as 750 RPM. Accordingly, the torque transferred between shafts 19 and 32 will be generally proportional to the magnitude of the analog current signal applied from controller 20 to the solenoid of valve 28. (In alternate embodiments where an analog voltage signal, a PWM current signal, or a PWM voltage signal is provided to valve 28, the torque transferred between shafts 19 and 32 also will be generally proportional to the magnitude of the applied signal, which in the case of a PWM signal is proportional to the duty cycle or pulse width of the signal.) While, in the ideal case, it may be convenient to have the torque transferred between shafts 19 and 32 exactly proportional to the magnitude of the current signal applied to valve 28, in mechanical systems such a relationship may be difficult to obtain. Accordingly, controller 20 is programmed to compensate for the inability to obtain such proportionality, and overall non-linearity in the electronics and mechanism of the control system 10.

Also shown in FIG. 1 is an implement 17 that may be attached to (typically, towed by) tractor 12. Implement 17 includes equipment (not shown) that is operated by way of power from tractor 12. The equipment may perform one or more actions upon a field, such as planting or tilling. Implement 17 is capable of receiving power from tractor 12 via an implement input shaft 51 coupled to high speed PTO 33 via a coupler 47. When PTO clutch 18 is engaged and is transmitting power from engine 14 to output shaft 32 and high speed PTO 33, power is also then transmitted to implement input shaft 51. In addition to implement input shaft 51, implement 17 also include an implement output shaft 85 that couples, and transmits power from, the implement input shaft to the equipment. Implement input shaft 51 and implement output shaft 85 are coupled via an over-running clutch 87. Over-running clutch 87 allows implement output shaft 85 to continue to rotate freely even when implement input shaft 51 is not rotating, and allows the implement output shaft to rotate at a higher angular velocity than the implement input shaft. If locking pins and notches (not shown) of over-running clutch 87 are not engaged, implement input shaft 51 must rotate a portion of a revolution to engage the pins with the notches before the over-running clutch will transmit power from the input shaft to implement output shaft 85. Implement input shaft 51 is coupled to high speed PTO 33. In alternate embodiments, a similar implement input shaft may be coupled to low speed PTO 35 by way of a second coupler (not shown).

Figure 2:
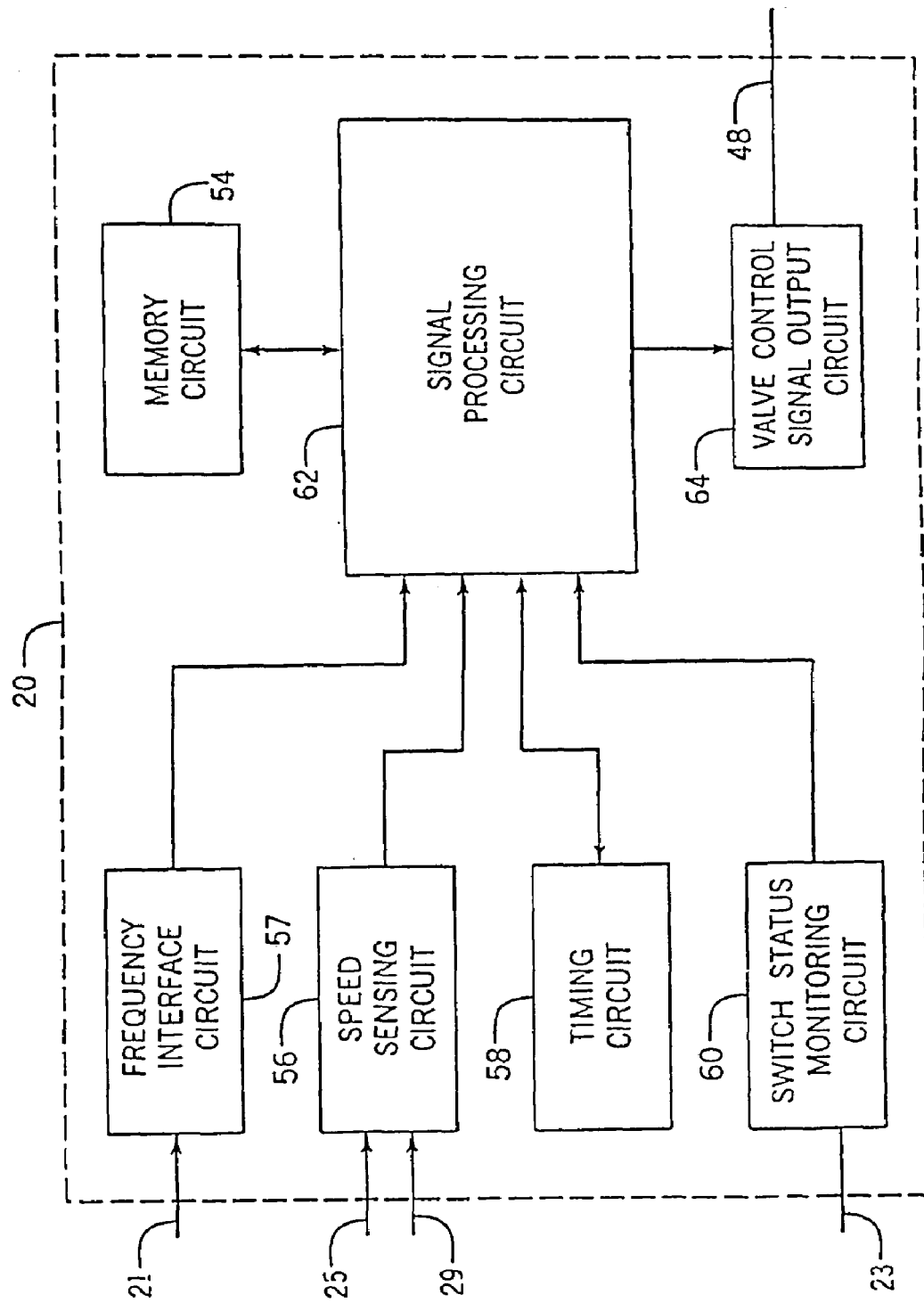
FIG. 2 is a schematic block diagram representative of the circuit configuration for a controller of the control system.

Referring now to FIG. 2, controller 20 is depicted as including a memory circuit 54 (which may include RAM and ROM) and/or as being configured or programmed to provide the operations of a speed sensing circuit 56, a timing circuit 58, a switch status monitoring circuit 60, a signal processing circuit 62, and a valve control signal output circuit 64. The direction and channels for data flow between circuits 54, 56, 57, 58, 60, 62 and 64 are shown in FIG. 2. The ROM of memory circuit 54 stores those values required for system 10 initialization and the constants required for the operation of certain programs run by controller 20. The RAM of memory 54 provides the temporary digital storage required for controller 20 to execute the system program. While, at the present time, memory such as RAM and/or ROM is preferred, memory need not be limited to such types, and other memory types, including for example, chemical, optical, bubble, and biological, can also be utilized as may be appropriate.

It will be appreciated by those skilled in the art, that, although reference has been made hereinabove to various circuits and memory and to operations described and discussed with reference thereto, such referenced circuits and their operations, including operations as discussed and described hereinafter, may, in various embodiments, be considered to be encompassed within or associated with a programmed or programmable processor or microprocessor and its associated memory and input and output circuitry. In such regard, and with particular regard to various embodiments of control system 10, actions associated herein with various circuit portions of controller 20 may thus be effectively carried out or accomplished in accordance with the programming of a microprocessor or other control device or mechanism or by other devices or mechanisms so connected as to operate in a like or similar manner to perform the necessary actions.

Frequency interface circuit 57 and speed sensing circuit 56 receive signals from alternator 16 and transducer 26 that are applied to conductors 25 and 29, and convert the signals to digital values representative of the rotational speeds of engine 14 (or input shaft 19) and output shaft 32, respectively. (In alternative embodiments, speed sensing circuit 56 may receive signals from transducer 24 that are applied to conductor 25, and convert those signals to digital values representative of the rotational speed of input shaft 19, in place of or in addition to frequency interface circuit 57, alternator 16 and conductor 21.) Insofar as the output of alternator 16 is a square-wave, frequency interface circuit 57 may operate as a timing interface that measures the time between pairs of edges of the square wave.

Timing circuit 58 includes counters which are utilized by signal processing circuit 62 while executing the programming for the engagement strategy.

Switch status monitoring circuit 60 converts the signals applied by switch 22 to conductor 23 to digital values representative of the status of these switches.

Valve control signal output circuit 64 produces an analog signal, such as an analog current signal, applied to the solenoid of valve 28 via conductor 48 and isolation circuit 44, having an appropriate magnitude.

As is briefly discussed below, the program executed by controller 20 is preferably executed at 100 Hz (although, in alternate embodiments the program could be executed at other frequencies). (In an alternate embodiment in which valve 28 is provided with a PWM current or voltage signal, valve control signal output circuit 64 would produce a 400 Hz PWM current or voltage signal having an appropriate pulse width. Assuming the same program execution frequency of 100 Hz, the pulse width of the signal from circuit 64 would be updated every 10 milliseconds or every 4 cycles of the PWM signal.)

Figure 3:
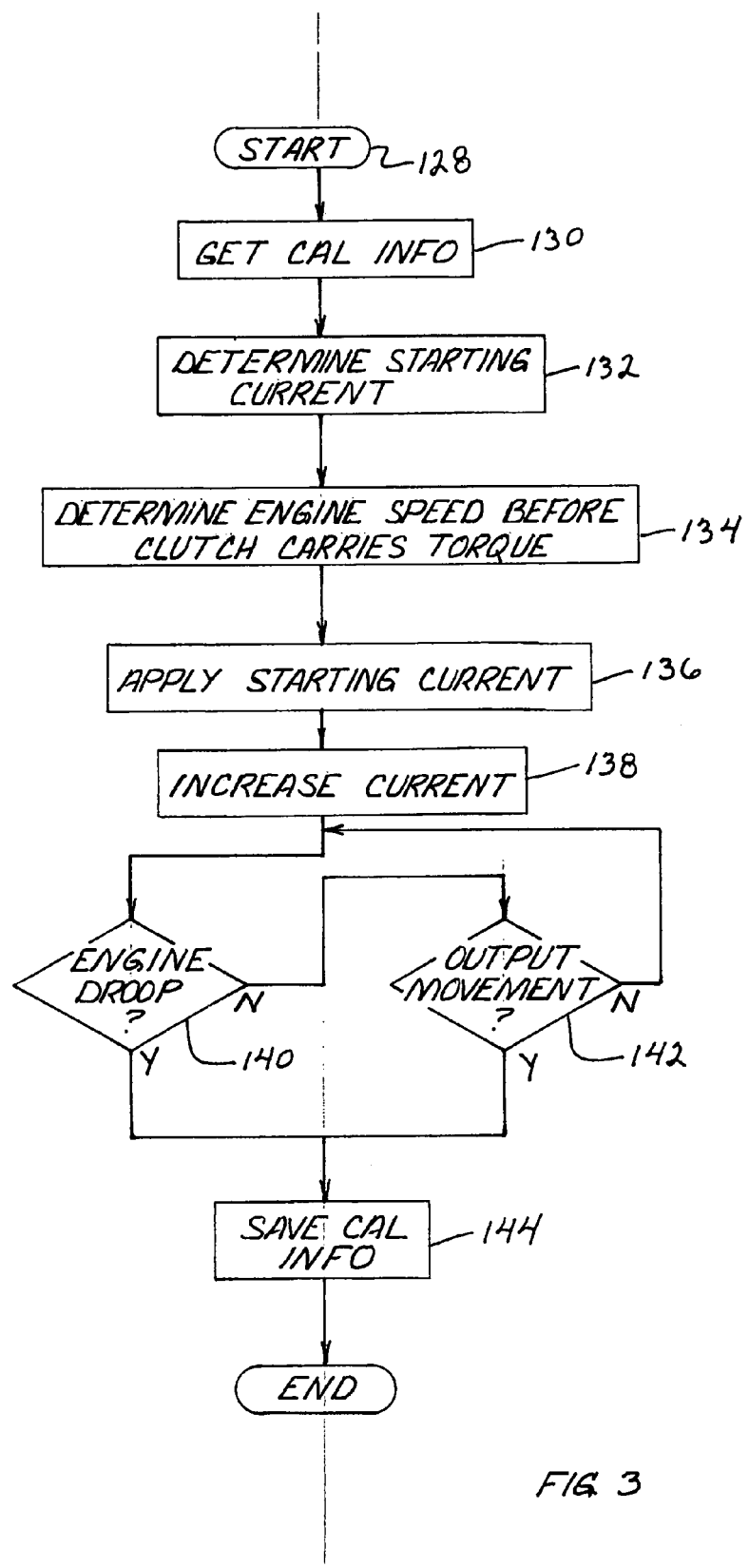
FIG. 3 is a high level flow diagram of steps for determining a starting control signal value according to the invention.
Figure 3A:
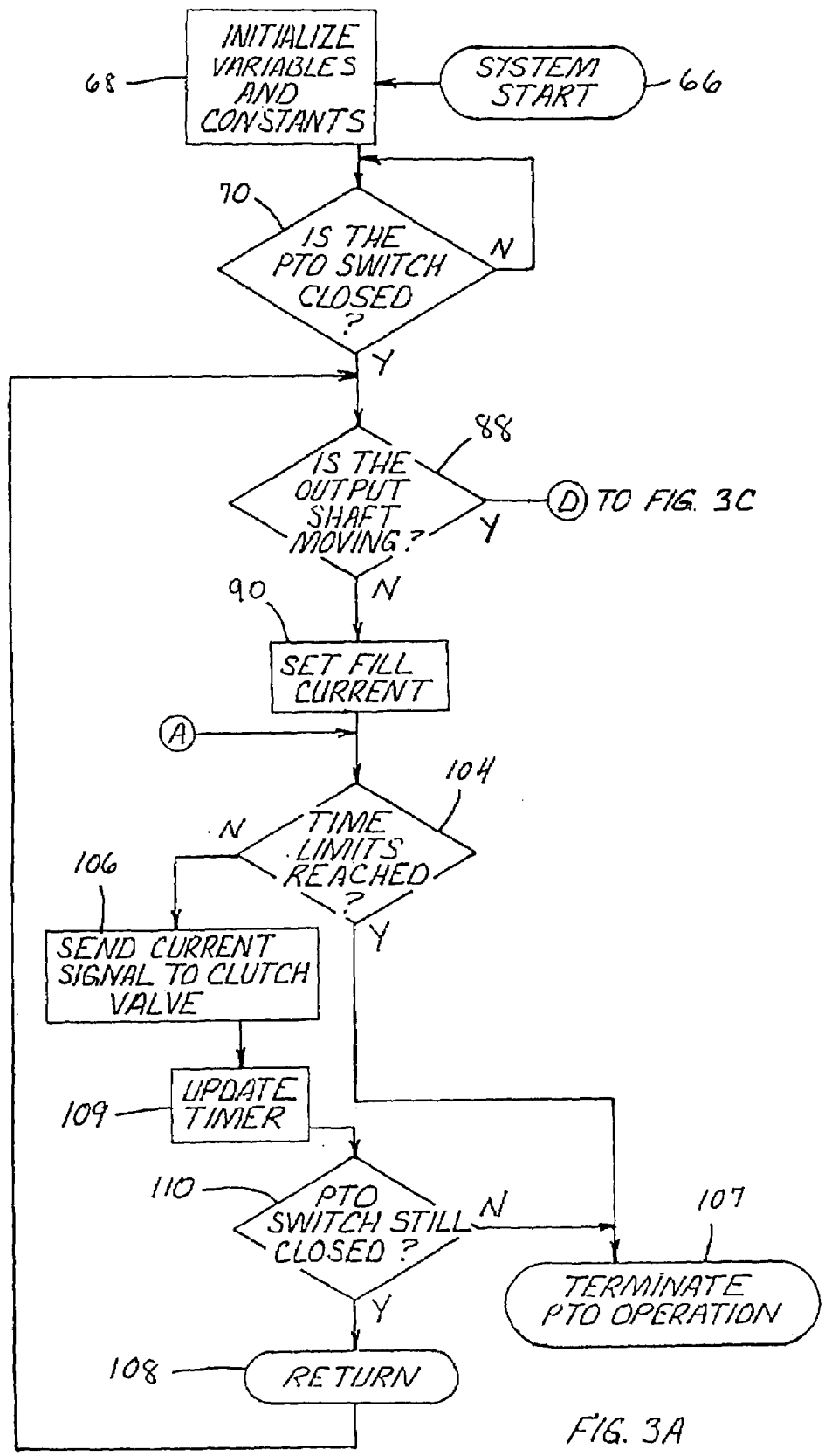
FIG. 3A is a flowchart representative of the general sequence of operation of a control system embodiment.
Figure 3B:
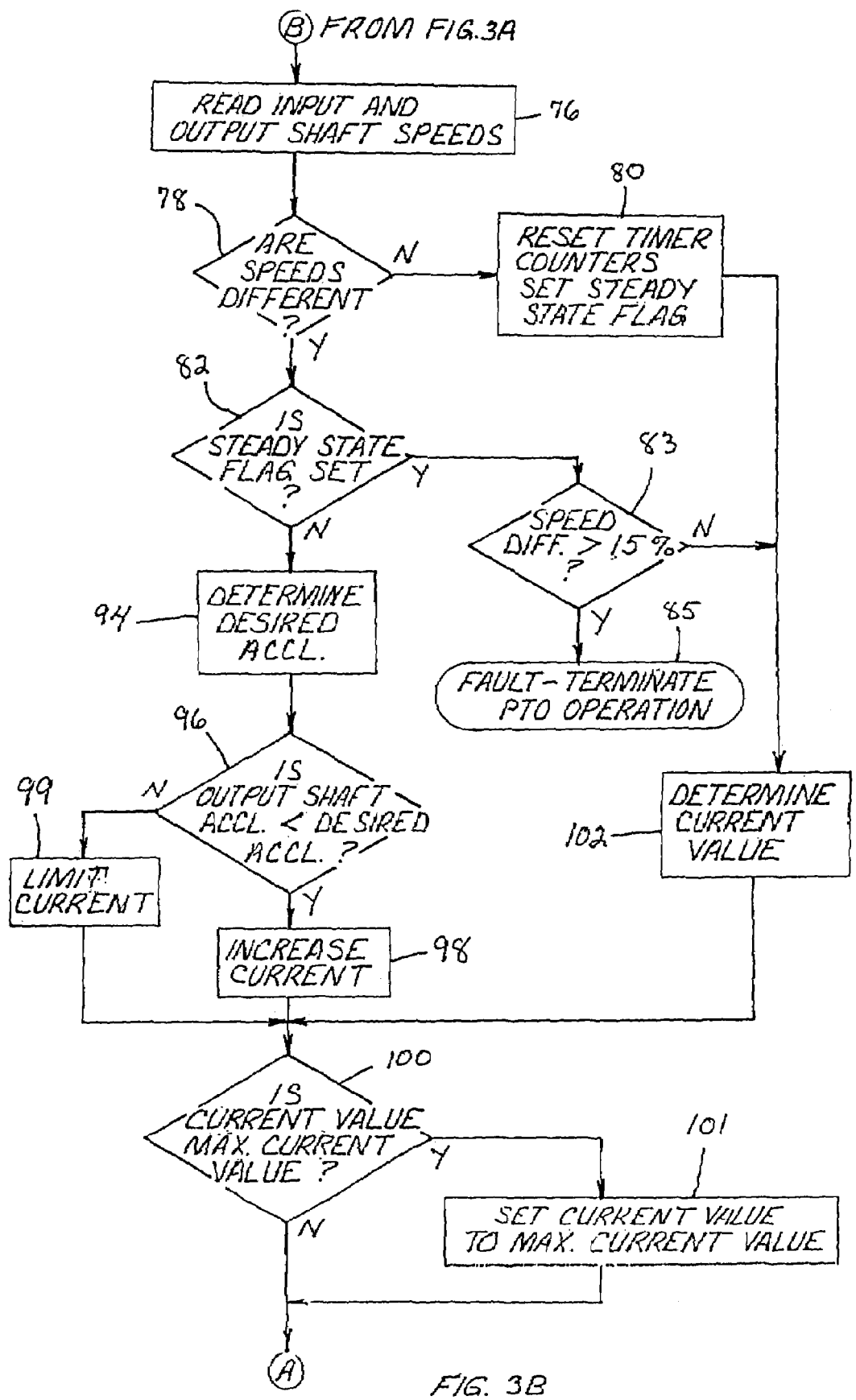
FIG. 3B is a continuation of the flowchart of FIG. 3A.
Figure 3C:
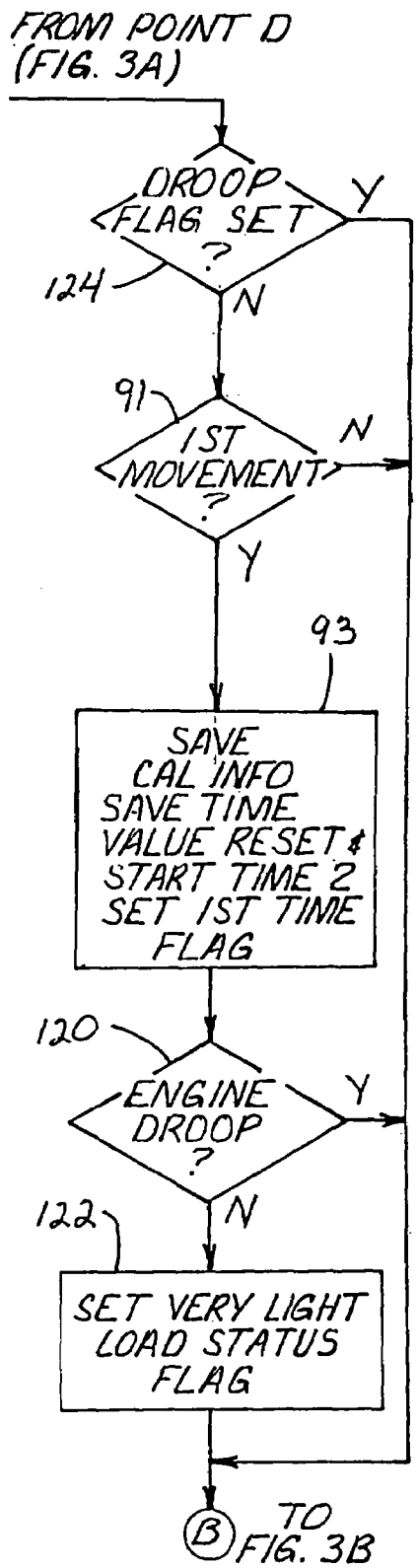
FIG. 3C is another continuation of the flowchart of FIG. 3A.
Figure 4:
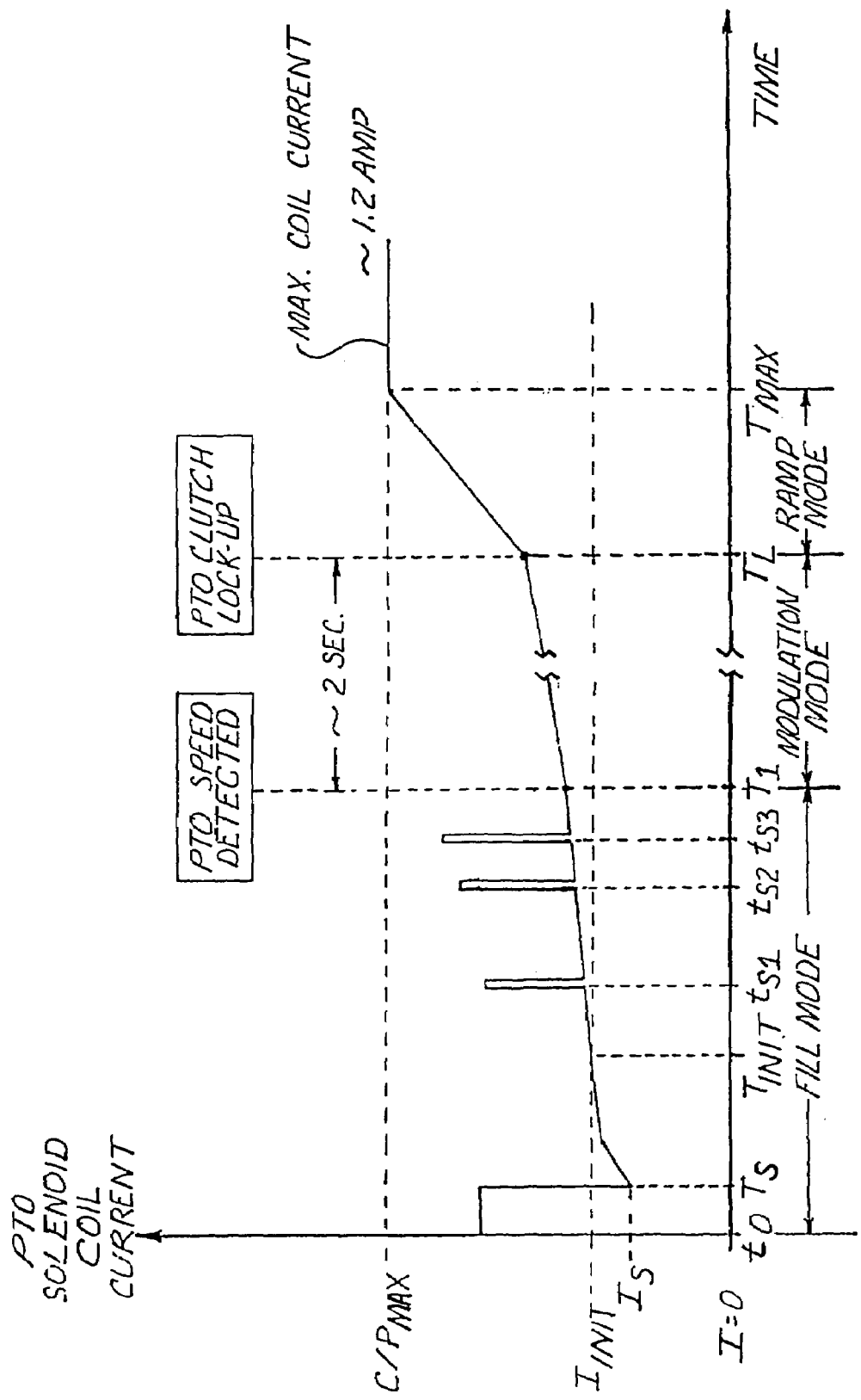
FIG. 4 is a graphical representation of a particular application of current/pressure control signals to the hydraulic valve of the control system over a period of time.

FIGS. 3A, 3B and 3C depict a representative operational sequence of a PTO engagement and operation such as might occur with the system of the present invention, and FIG. 4 illustrates the effects of such an operational sequence. Basically, there are three sequential modes of electrical signal modulation of the PTO valve, designated as the FILL MODE, the MODULATION MODE and the RAMP MODE, which are indicated along the horizontal axis in FIG. 4. The vertical axis in FIG. 4 represents the PTO valve current in units of amps, and the horizontal axis represents time. Typically, the PTO module modulates the valve by varying analog current to the coil. Superimposed on the control current is a fixed frequency dither signal. FIG. 4 is a representational figure whose purpose is to illustrate certain features, and is therefore not necessarily to scale.

$I_{INIT}$ shown in FIG. 4 is the current level at which a PTO solenoid coil is cracking the PTO valve open just enough for the PTO clutch to start carrying torque. The value of this current level comes from PTO calibration which may be predetermined or otherwise established in various ways. The value of such current is typically between 200–400 ma.

Time $t_{S1}$ in FIG. 4 is the time at which the PTO control current reaches $I_{INIT}$, typically around 500 ms.

In a more preferred form, the FILL MODE may be considered to have three identifiable stages: VALVE WAKE-UP, GENTLE INCREMENT, and LOW ENERGY SHOCKS. The system is hereafter described with reference to the more preferred form of a FILL MODE, although it should be recognized that the present invention can also be employed with a more basic FILL MODE that does not employ as many differentiable stages but which nevertheless effects over some time period an increase in applied torque between the input and output shafts to effect initial movement of the output shaft. Regardless of form, FILL MODE is considered to begin at $t_0$ with PTO speed at zero when PTO switch 22 is closed and to end when PTO speed (output shaft movement) is detected, such as at $T_1$. The time at which PTO speed is detected is the start of the MODULATION MODE.

In its preferred form, the FILL MODE preferably starts with a VALVE WAKE-UP stage. The waking up current is typically about 200 ma above $I_{INIT}$. The duration of such stage may be made to depend upon how long the PTO has been in OFF state, and may typically be set, as indicated below:

| PTO off time | Wake-up duration |
|---|---|
| <=500 msec | 0 |
| >500 msec | 10 msec |
| >800 msec | 20 msec |
| >1200 msec | 30 msec |
| >2000 msec | 40 msec |
| >4000 msec | 60 msec |
| >6300 msec | 70 msec |

Utilization of a VALVE WAKE-UP stage speeds up the filling up of the PTO valve and conditions the valve to be ready to carry torque.

After valve wake-up, the current will preferably drop to a starting current value $I_S$ which will be about 40 ma below $I_{INIT}$ and thereafter quickly enter the GENTLE INCREMENT stage. During such stage, the current keeps increasing, generally gently after, perhaps, a more pronounced initial increment, until either 1.5 seconds has passed or PTO speed is detected, with the current to the PTO valve typically increasing by approximately 0.03 percent of maximum current every 10 ms. It has been found desirable to increment the current so that, after approximately 1.5 seconds, the applied current will typically be about 40 ma above $I_{INIT}$.

If, at any time during the FILL MODE, PTO shaft speed is detected, the FILL MODE ends and the MODULATION MODE starts.

If PTO shaft movement occurs without appreciable engine droop or the PTO shaft speeds up fairly quickly and without appreciable engine droop, the controller recognizes such conditions as being indicative of a no load or very light load condition, which could also initially signify possible use of an over-running clutch. It has been found desirable to employ an even more gentle current modulation in such instances to accommodate the possibility that an over-running clutch is associated with the output shaft, and the manner in which this accomplished will be further addressed hereinafter. On the other hand, if engine droop is detected prior to output shaft movement, a heavier load is indicated. The time at which engine droop is detected, and the degree thereof, can be indicative of the heaviness of the load.

As noted above, it has been found that the loading condition on the PTO can have a significant impact on the smoothness of the clutch engagement and the load on the drive train and power source. Clutch wear, fluid temperature, and fluid system pressure also impact the initial current $I_{INIT}$ at which initial torque carrying occurs and thus are also factors in the smoothness of the engagement. As a result of any combination of the above factors, if the starting current $I_S$ is too high and/or the subsequent current values applied during the fill mode and/or the modulation mode are increased too rapidly for an actual loading and other conditions on the PTO, the engagement can be rougher and/or the rotational speed of the engine can be decreased or droop to an undesirable extent, and even stall. These are undesirable occurrences as they can cause problems including premature or increased wear on the clutch and other drive line components and even damage. If the starting current value $I_S$ is too low and/or the subsequent current values during the fill mode and modulation mode are increased too slowly for an actual loading condition on the PTO, that is, the actual load condition is lighter than anticipated, then the engagement will likely be smooth, but the clutch will likely lock-up later than would be necessary. Similarly, if the starting current value $I_S$ is lower or higher than desirable for a given load condition or combination of the above factors, the later in time during the engagement process at which determination of the existence of the condition and correction or compensation is initiated, the shorter the time available for implementing the correction or compensation.

To avoid or reduce the influence or impact of factors such as those set forth above, including load conditions, clutch wear, fluid temperature and fluid system pressure, and/or to adapt to or compensate or correct for such conditions, controller 20 will determine the starting current value $I_S$ based at least in part on information stored in memory 54 relating to or derived from or determined during at least one previous engagement, particularly during the FILL MODE thereof. Preferably, the information used for the determining the starting value will include the $I_{INIT}$ current value from at least one previous engagement, and more preferably the $I_{INIT}$ from four previous engagements can be averaged and used as a reference for determining the $I_S$ current value for the next engagement.

As an option, if $I_{INIT}$ from the most previous engagement is beyond a predetermined range, or differs by more than a predetermined amount or in some predetermined manner from $I_{INIT}$ from the prior engagements, just the $I_{INIT}$ value from the last engagement can be used as the reference for determining $I_S$ for the next engagement, or just the $I_{INIT}$ values from the previous engagements can be used.

In FIG. 3, a high level flow diagram showing generalized steps for collecting information for determining $I_S$ according to the present invention is shown. After start block 128, at step 130 controller 20 will determine the starting current $I_S$. As noted above, preferably, starting current $I_S$ will be based at least in part on an average of $I_{INIT}$ for a number of previous engagements, preferably the last four engagements. At step 134, controller 20 determines the speed of engine 14 before clutch 18 is carrying torque. This step can occur at any time and provides a baseline under current conditions for determining if any engine droop as a result of engaging clutch 18 occurs. At step 136, after wake up, starting current $I_S$ is applied to begin engagement. The current is then gently increased, as denoted at step 138. At steps 140 and 142, engine speed and the speed of clutch output 32 are monitored. These steps can commence prior to application of starting current $I_S$ or later, and can be preformed in any order or simultaneously. Then, at step 144, information representative of the occurrence of the first of engine droop and output movement is saved as calibration information in memory 54. This information preferably includes $I_{INIT}$ and can include $T_{INIT}$.

If no PTO output shaft speed has been detected after approximately 1.5 seconds, according to optional steps, the FILL MODE can then enter the LOW ENERGY SHOCKS stage.

Previously known systems, while they may have utilized a WAKE-UP stage and/or a GNETLE INCREMENT stage during FILL MODE, have not made use of a LOW ENERGY SHOCKS stage. It has been found desirable to include such a stage in the FILL MODE because some implements require the application of higher current to the valve in order to break the implement loose (e.g., frictions, heavy static loads, etc.), but lower current to ramp up speed. However, it should be understood that the use of energy shocks is an optional procedure, and a background one that may not be evident to the operator. During the LOW ENERGY SHOCKS stage, low energy shocks, such as roughly 10 Hz pulses riding the base current increment, may be applied to more readily break loose the implement and to effect movement of the output shaft. The amplitudes of such pulses preferably starts from about 10 ma and gradually increases to about 50 ma.

It has been found that, after approximately 3.6 seconds, the torque capacity should typically be about enough to kill the engine. If no PTO shaft speed is detected by that time, and the engine has not been killed, the software will preferably stop the FILL MODE and terminate the PTO operation. The operator will then need to re-initialize the system, such as by turning the PTO switch Off and then back On to restart the PTO.

The operation of controller 20, especially with regard to the more preferred form of FILL MODE, will now be described in greater detail with reference to FIGS. 3A, 3B and 3C (FIGS. 3A, 3B and 3C represent the operational steps of the program run by controller 20.) Upon system startup at step 66, controller 20 reads the ROM of memory circuit 54 and initializes the counter in timing circuit 58. Controller 20 also initializes those other variables and constants which may be utilized in the programming of controller 20 as it proceeds to and through step 68.

At step 70, controller 20 checks the digital value representative of the status of PTO on/off switch 22, such as is available from switch status monitoring circuit 60, and remains in a loop back to such step if switch 22 is not detected as being closed. Once switch 22 is detected to be closed, operation will then advance to step 88 and proceed to execute the steps required to begin (or continue) engagement of clutch 18.

At step 88, by checking the value representative of the rotational speed of output shaft 32 (analogous to step 142 in FIG. 3), controller 20 determines whether or not shaft 32 is moving, and proceeds to step 90 if the output shaft 32 is not moving or to step 124 (FIG. 3C) if the output shaft 32 is moving.

If the output shaft 32 is not moving and operation has proceeded to step 90, the system is in its FILL MODE of operation and controller 20 sets a fill current value, which is dependent, in part, upon the particular time count.

In general, at step 90 the fill current value may be set in accordance with a predetermined current/pressure control curve, such as has been discussed generally hereinabove. This includes at the commencement the FILL MODE, at a time before time $T_S$, for instance, at time $t_0$, the step of determining a starting current $I_S$ as indicated at step 132 of FIG. 3.

At specific times during the later LOW ENERGY SHOCKS stage, the current value will be increased so as to provide a current shock to the clutch system. By way of example, at other than the specific times for application of current shocks, controller 20 may read the time associated with the times since the PTO switch was closed, such as from a timer counter of circuit 58, and set the current magnitude value to a predetermined percentage if switch 22 has been closed less than a given time. If the time is greater than that given time, the current magnitude value may be increased by 0.1% for each 10 ms increment of time elapsed subsequent to switch 22 being closed for that given time. (In an alternative embodiment, the pulse width may be set to a predetermined percentage (e.g. 20%) of the maximum pulse width value if switch 22 has been closed for 300 ms or less. If the time is greater than 300 ms, the pulse width value may be increased by 0.1% for each 10 ms increment of time elapsed subsequent to switch 22 being closed for 300 ms.)

Figure 6:
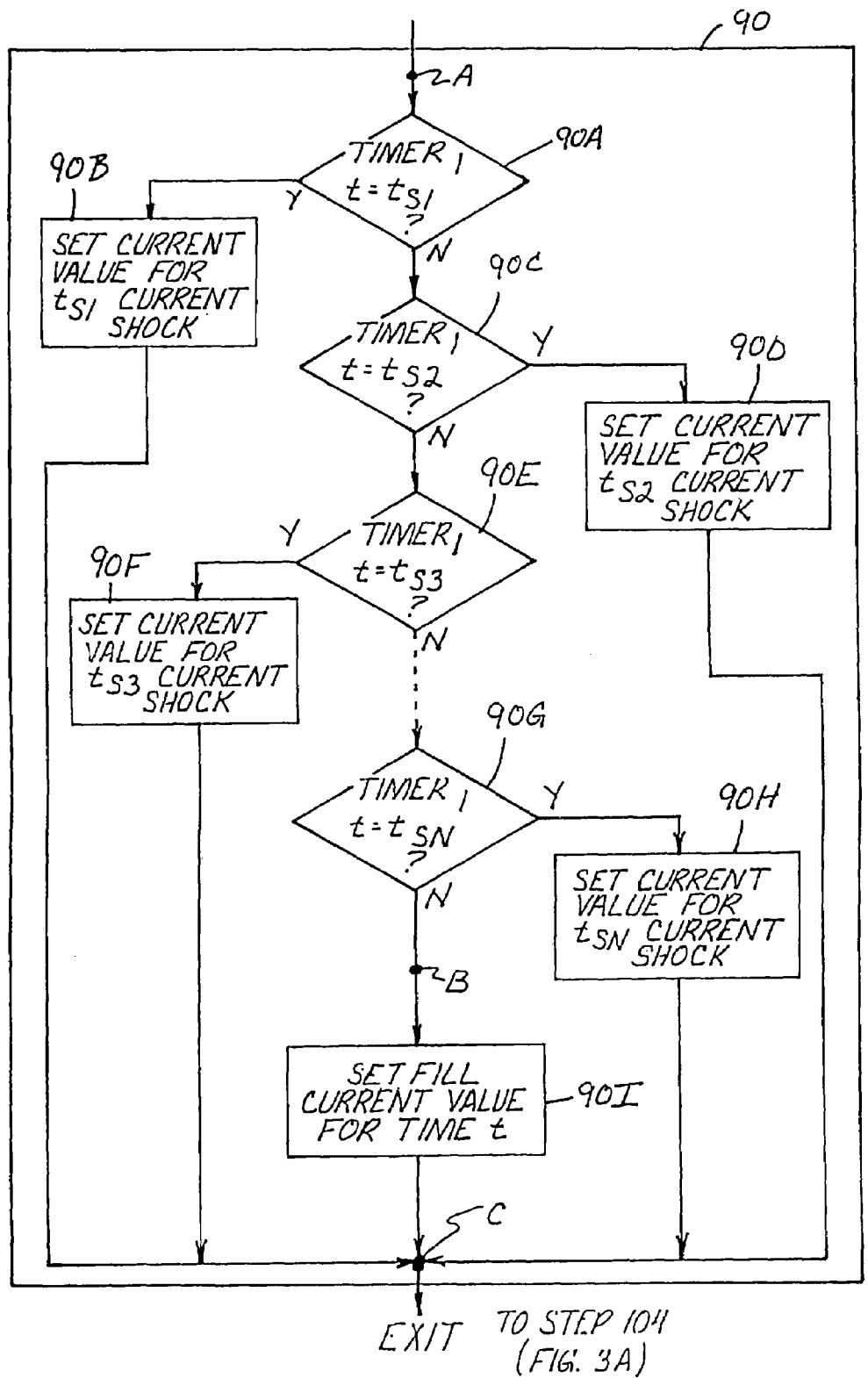
FIG. 6 is a flowchart representative of one embodiment of the functionality of step 90 of the flowchart of FIG. 3A.

At the specific times at which current shocks are to be applied, the current values are set to a significantly higher value than would otherwise be the case. FIG. 6 is a flowchart setting forth one embodiment of a more detailed operational sequence of step 90 of FIG. 3A, showing how the current shock values, such as the increased magnitude of the current, can be set to occur at times $t_{S1}$, $t_{S2}$, $t_{S3}$, and $t_{SN}$. Although only a single shock is depicted in FIG. 4 at such times, it should be appreciated that application of a series of shocks commencing at such times is also possible and preferable.

When no movement of the output shaft 32 has been detected at step 88 and the engagement operation has progressed to step 90, then with particular reference to FIG. 6, at step 90A controller 20 checks whether the then-current time is time $t_{S1}$, the time at which a first current shock is to be applied if the output shaft 32 has not commenced movement by that time. If the time t is $t_{S1}$, controller 20 proceeds to step 90B where it sets the current value to be used in applying the current shock at time $t_{S1}$ before proceeding through point C of FIG. 6 to step 104 of FIG. 3A.

If, at step 90A, the then-current time is not equal to $t_{S1}$, controller 20 proceeds to step 90C where it next checks whether t is equal to $t_{S2}$, the time at which a second current shock is to be applied if the output shaft 32 has not commenced movement by that time. If the time t is $t_{S2}$, controller 20 proceeds to step 90D where it sets the current value to be used in applying the current shock at time $t_{S2}$ before proceeding through point C of FIG. 6 to step 104 of FIG. 3A.

If, at step 90C, the then-current time is not equal to $t_{S2}$, controller 20 proceeds to step 90E where it next checks whether t is equal to $t_{S3}$, the time at which a third current shock is to be applied if the output shaft 32 has not commenced movement by that time. If the time t is $t_{S3}$, controller 20 proceeds to step 90F where it sets the current value to be used in applying the current shock at time $t_{S3}$ before proceeding through point C of FIG. 6 to step 104 of FIG. 3A.

If, at step 90E, the then-current time is not equal to $t_{S3}$, controller 20 can proceed to other steps such as step 90G, if the system is designed to provide additional current shocks at other times, or, if no additional current shocks are to be applied with a particular system, to step 90I. At step 90G, controller 20 checks whether t is equal to $t_{SN}$, the time at which an Nth current shock is to be applied if the output shaft 32 has not commenced movement by that time. If the time t is $t_{SN}$, controller 20 proceeds to step 90H where it sets the current value to be used in applying the current shock at time $t_{SN}$ before proceeding through point C of FIG. 6 to step 104 of FIG. 3A. If t is not equal to $t_{SN}$ at step 90G (or to a value of t at any of steps 90A, 90C, or 90E, if the system is designed to apply fewer than 2, 3, or N shocks, respectively), controller 20 proceeds to step 90I where it sets the fill current value for time t in a manner such as has been previously explained hereinabove with reference to step 90 of FIG. 3A before proceeding through point C of FIG. 6 to step 104 of FIG. 3A.

Figure 10:
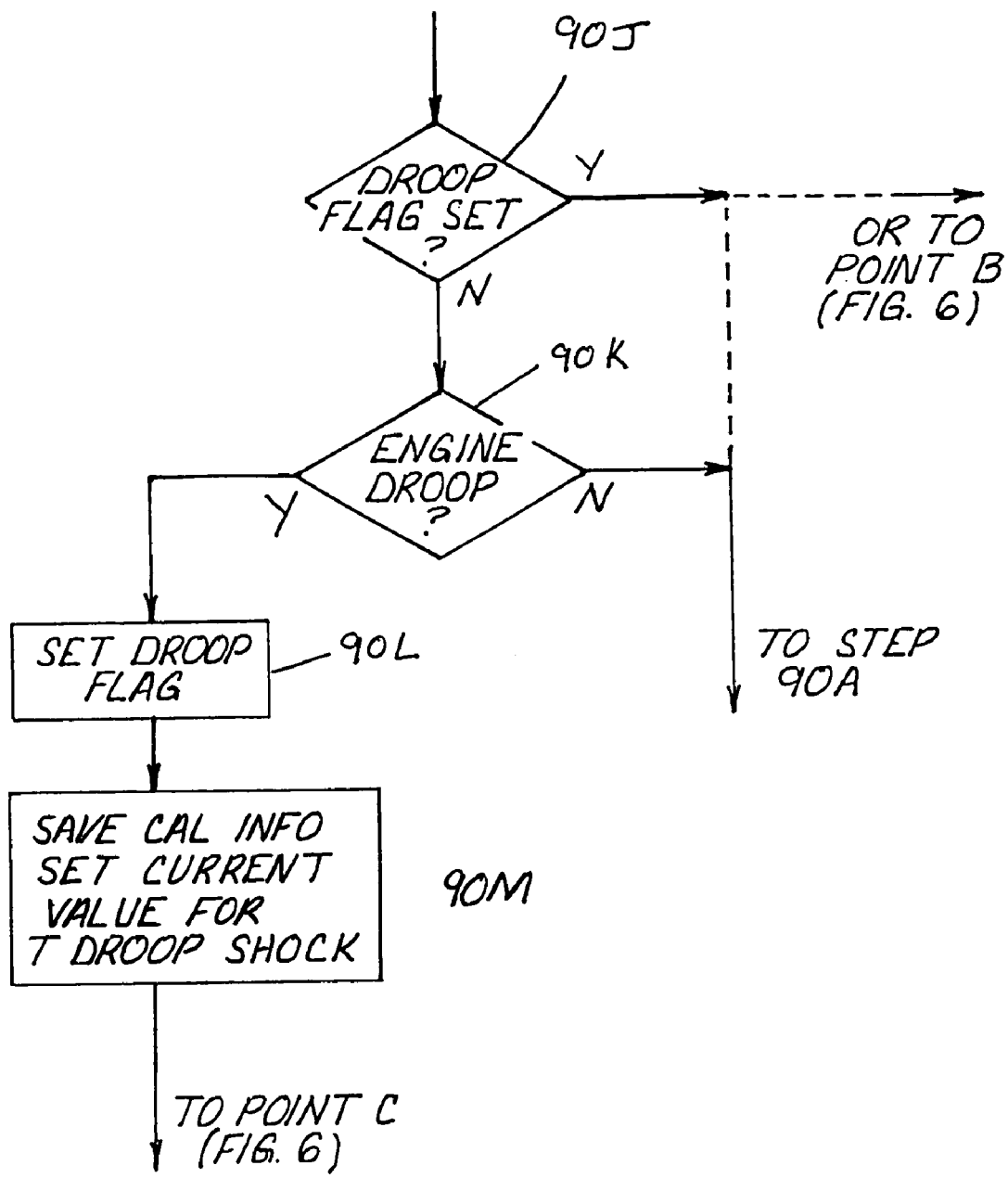
FIG. 10 is a flowchart representative of an additional operational steps that may be included in a point A in the operational sequence in FIG. 6.

FIG. 10 is another flowchart setting forth an optional feature that may be included within the operational sequence of FIG. 6, including additional steps at point A of FIG. 6, showing how a current shock value can be triggered by detection of engine droop prior to detection of movement of output shaft 32. As shown in FIG. 10, upon reaching step 90 (in FIG. 3A), and before proceeding to step 90A, controller 20 may first determine whether a DROOP flag has been set. If such a flag has been previously set, the controller may proceed, for example, either to point B of FIG. 6 or to step 90A of FIG. 6, depending upon particular systems.

If, however, DROOP flag has not been previously set, controller 20 proceeds to step 90K, where it checks to see if any engine droop (or a degree of engine droop) is detected. If not, controller 20 proceeds to step 90A on FIG. 6; if so, it proceeds to step 90L.

At step 90L, controller 20 sets the DROOP flag before proceeding to step 90M, where controller 20 saves information relating to the droop, which can include the time of the occurrence of the droop and also the level of the droop, and sets a current shock valve to be applied, at $t=T_{DROOP}$, before proceeding to and through point C of FIG. 6 to step 104 of FIG. 3A.

Once the current value for time t has been set at step 90, such as at steps 90B, 90D, 90F, 90H, or 90I of FIG. 6 or step 90M of FIG. 10, operation then proceeds to step 104 (FIG. 3A), which step will be further addressed at a later point hereinafter.

From the foregoing discussion and description, it should be understood that a purpose of steps 88 and 90 is to effect smooth engagement of PTO clutch 18. A certain volume of hydraulic fluid must be provided to PTO clutch 18 before the clutch plates of PTO clutch 18 travel through the distance required to engage the clutch plates. During a clutch filling process, it is undesirable to apply hydraulic fluid to the clutch at a fixed or undesirably high pressure since the clutch will abruptly apply torque from input shaft 19 to output shaft 32. Such an abrupt application of torque can potentially cause damage to output shaft 32 or an associated implement connected to the PTO output shaft. By initiating the filling of clutch 18 with a pressure equivalent to the pre-stress force applied by the clutch springs, and by applying current to the valve to effect a controlled filling of clutch 18, the clutch plates can be made to move relatively slowly toward engagement, and the pressure can be controllably increased gradually until engagement. This process prevents the abrupt transfer of torque from input shaft 19 to output shaft 32.

As is depicted in a somewhat idealized form in FIG. 4, following valve wake-up at time $t_0$, the current/pressure applied over time from $T_S$ starts at a lower starting level $I_S$ and increases in accordance with the current fill values established at step 90 until time T1, when the first motion of the output shaft 32 occurs and is detected at step 88. During the period between $t_0$ and T1, at times $t_{S1}$, $t_{S2}$, and $t_{S3}$, current shocks are shown as having been applied, consistent with current values as set at steps 90B, 90D, and 90E. As shown in FIG. 4, application of the current shocks need not occur at equally spaced intervals from one another, but can occur at times selected for and matched to particular systems. As has previously been noted, during such time period from $t_0$ to T1, following initial application of current of a given magnitude for a short duration, it has been found to be advantageous to gradually increment the current, such as by approximately 0.03 percent of maximum current every 10 ms, until motion of the output shaft 32 is detected. As has previously been explained, the current shocks provide a higher magnitude of current for brief durations at the times of their application.

In alternative embodiments employing PWM signals, the pulse width of the PWM signal may be initiated at a certain duty cycle (e.g. 20%) at time $t_0$ and increased in gradual steps until output shaft 32 begins moving as determined at step 88. At the times when a current shock is to be applied, the pulse width may be expanded to achieve the short duration pressure shock desired at the PTO clutch 18.

Referring now again to FIG. 3A, as has previously been discussed, once the fill current has been set, controller 20 proceeds from step 90 of FIG. 3A to step 104. At step 104, controller 20 checks if the timer has timed out. If so, controller 20 proceeds to step 107 and terminates the PTO operation; if not, it proceeds directly to step 106.

At step 106, controller 20 operates to send the established current value to PTO clutch valve 28 before proceeding to step 109, where it updates the timer before proceeding to step 110. At step 110, controller 20 checks to see if the PTO switch is still closed. If not, controller 20 proceeds to step 107, where the PTO operation is terminated. If the switch is still closed, however, controller 20 proceeds to step 108, which identifies a return to step 88 and commencement of another loop of the engagement operation. (At step 106, for embodiments that use PWM techniques, controller 20 may effect application of a pulse width modulated signal to valve 28 via conductor 48 at a frequency of 400 Hz with a pulse width corresponding to the current pulse width value as set in that particular loop through the operation sequence.)

It will be appreciated that various checks and actions may be associated with RETURN 108 for effecting a conclusion of the operational sequence and cessation of further looping through the sequence, and for securing information or initializing values for further activities, depending upon the system. By way of example, previous speed values for the input and/or output shafts may be saved for future reference, if desired, and new speed values may be read at such step for reference and use upon return of the operation to step 88 and successive steps.

It should be understood that the foregoing discussion has now described the loop operation from step 88 through RETURN step 108 and back to step 88, which looping operation occurs during the FILL MODE. The controller 20 causes the timer counter to be updated by a specified amount upon each passage through step 109, which amount is related to the time it takes to cycle through the operational loop. (For the programming represented by the flow charts of FIGS. 3A, 3B and 3C), running at a rate of approximately 100 Hz, one cycle is approximately 10 ms. Accordingly, for one cycle, the counter is updated by a count value associated with 10 ms.)

Referring again to FIG. 3A, upon a looping pass through step 88, if shaft 32 is detected to be (already) moving, FILL MODE ceases and system operation enters (or continues) with either the MODULATION MODE or RAMP MODE of operation as controller 20 proceeds to step 124 (FIG. 3C) instead of to step 90.

At step 124, if the engine droop flag has been set, controller 20 proceeds through point B of FIGS. 3A and 3B to step 76 of FIG. 3B. If the engine droop flag has not been set, controller 20 proceeds to step 91 to determine if the movement detected at step 88 is the first movement of the output shaft. If not, controller 20 proceeds through point B of FIGS. 3A and 3B to step 76 of FIG. 3B. If the movement is the first movement, the MODULATION MODE commences and controller 20 proceeds to step 93 where it saves the time of such detected movement as TIMER1, resets and starts a timer for TIMER2, and sets a $1^{ST}$ TIME flag before proceeding to step 120. The saving of the value of the current at which the first movement is detected and the time thereof corresponds to step 144 of FIG. 3. If the detected movement is not the first movement of the output shaft, controller 20 instead proceeds through point B of FIGS. 3A and 3B to step 76 of FIG. 3B.

If the movement detected at step 91 is the first movement and operation has proceeded through step 93 to step 120, at step 120 controller 20 checks to see if engine droop (or a degree of engine droop) has occurred at that time. Typically this may take the form of determining whether the difference between a previous (nominal) engine speed value and the current engine speed value is within or without an established deviation value. If the difference exceeds the established deviation value, such finding is indicative of the application of a significant enough load to the engine as the output shaft begins to move that the load is considered to be other than a very light load or an associated over-running clutch. In such instance, controller 20 proceeds through point B of FIGS. 3A and 3B to step 76 of FIG. 3B. On the other hand, if the difference is within the deviation value, such finding is considered indicative of the existence of either or very light load or an associated over-running clutch, and controller 20 then proceeds to step 122.

At step 122, controller 20 sets a VERY LIGHT LOAD status flag before proceeding through point B of FIGS. 3A and 3B to step 76 of FIG. 3B.

The lack of engine droop detected at step 120 when first movement of the output shaft is detected at step 91 is significant because such determinations, in combination, identify reactions encountered when the load that is applied is very light or when an over-running clutch has been encountered and the locking pins of such over-running clutch have not yet engaged the locking notches of such over-running clutch, in which situations the initially detected load on the PTO output shaft presents little initial resistance to the applied torque through the PTO clutch and little loading of the engine.

Detection of movement of the output shaft at step 88 and determination of first movement at step 91 is significant because such actions identify the conclusion of the FILL MODE and the commencement of the MODULATION MODE. As is depicted on FIG. 4, MODULATION MODE directly follows the FILL MODE and is initiated when PTO speed (output shaft movement) is first detected. After detection at $T_1$ of PTO shaft speed, controller 20 modifies the analog command signal to the valve based on acceleration of the PTO clutch until PTO CLUTCH LOCK-UP occurs (i.e., when PTO clutch slip meets the criteria for a locked clutch condition) at $T_L$.

In general, during the period between PTO speed detection and clutch lock-up, the analog command signal is typically adjusted depending upon the relationship between the calculated acceleration of the PTO clutch compared to the target acceleration value. Controller 20 monitors engine rpm and typically assumes it will be constant for the next 2 seconds. From engine speed, the controller then typically calculates the PTO acceleration required to achieve PTO clutch lock-up within approximately 1.8 seconds. If the acceleration is lower than the target acceleration value, the control current will be increased accordingly unless the engine rpm has been loaded too low. If the acceleration is higher than the target acceleration value, the control current will be decreased accordingly in the early stage of modulation. Typically, if modulation has been in process for over 1 second, or the PTO has been turned on for over 4 seconds, or the clutch slippage is less than 50%, the control current will not be decreased even if the acceleration is higher than the target acceleration value, although these features may be altered depending upon particular systems and users.

A recognized difficulty with such procedure is that the engine speed will rarely, if ever, remain constant for 2 seconds, but will, in actuality, vary over such time, perhaps drastically, as would be the case when an associated over-running clutch locks up after a short period of lock-up delay. As noted above, if output shaft movement occurs without appreciable engine droop or the PTO shaft speeds up fairly quickly and without appreciable engine droop, the controller recognizes such conditions (such as at steps 120 and 122) as being indicative of a no load or very light load condition, which could also initially signify possible use of an over-running clutch. It has been found desirable to employ an even more gentle current modulation in such instances to accommodate the possibility that an over-running clutch is associated with the output shaft, and the manner in which this accomplished will be further addressed hereinafter.

With the foregoing in mind, when operation proceeds to step 76 of FIG. 3B, controller 20 obtains the digital values representative of the rotational speeds of input shaft 19 (or engine 14) and output shaft 32 (which may be the some of the same values as utilized in steps 88 and 120), such as provided to signal processing circuit 62 from circuits 56 and 57, and proceeds to step 78, where it then compares the speeds of shaft 19 (or engine 14) and shaft 32, and, depending upon such comparison, proceeds either to step 80 or step 82.

If the shaft speeds are the same (or are within some degree of tolerance of the speeds or proportions thereof), signifying that PTO clutch lock-up has occurred, as will be further discussed hereinafter, MODULATION MODE terminates, RAMP MODE commences, and operation proceeds to step 80.

However, if, at step 78, the shaft speeds are not the same (or are not within some degree of tolerance of the speeds or proportions thereof), which is the expected situation when output shaft movement is first detected and MODULATION MODE commences, operation proceeds instead to step 82, where controller 20 checks to see whether or not the STEADY STATE flag has been set, (signifying that PTO clutch lock-up had previously occurred). During MODULATION MODE, the STEADY STATE flag will not as yet have been set and controller 20 will therefore proceed to step 94.

The tolerance level at step 78 may be dependent, in part, upon the Time2 value reset at step 93 and may be set to such a level to ensure, for example, in the case of an associated over-running clutch, that speeds will not be considered the same during a possible lock-up delay period of the associated over-running clutch. Alternatively, controller 20 could be configured or programmed to bypass steps 76, 78, and 82 and to instead proceed directly to step 94 for a short but sufficient period of time following the setting of the VERY LIGHT LOAD status flag in order to ensure completion of any lock-up delay period before a determination is made at step 78 that the speeds of the input and output shafts of the PTO clutch have been equalized.

At step 94, controller 20 then sets a desired acceleration, which acceleration may, in some instances and with certain embodiments, be calculated once, upon a first pass through step 94 during a PTO engagement operation and thereafter relied upon in subsequent passes through step 94 during such engagement operation, and in other instances and with other embodiments, be recalculated in subsequent passes through step 94 in an engagement operation. By way of example, the desired acceleration, whether calculated once or multiple times, may be calculated such as by dividing the speed of the input shaft 19 at the time of calculation by 2 seconds.

In general, the first pass through step 94 is the start of the process for controlling clutch 18 to accelerate output shaft 32 relative to input shaft 19 until the speed of output shaft 32 reaches its steady state speed (no clutch 18 slip) which equals or is proportional to the speed of input shaft 19. The desired acceleration of output shaft 32 at step 94 is preferably calculated based upon approximately 1.8–2.0 seconds, which has been selected, based upon experimentation, to generally provide optimum acceleration of output shaft 32. However, depending upon the system configuration, such time period may be varied according to the particular tractor and PTO application. The calculated acceleration serves as a reference for accelerating output shaft 32 relative to input shaft 19 at step 96.

It will be appreciated that by selecting a longer acceleration period a flatter, more gentle control curve can be obtained and that by selecting a shorter acceleration period a steeper control curve can be obtained. With this in mind, it will also be appreciated that use of a flatter, more gentle control curve instead of a steeper control curve is initially desirable for certain extreme load situations, such as when an associated over-running clutch is employed. because it will allow a slower acceleration during the lock-up delay period and a consequent less abrupt reaction when the over-running clutch locks up and the "true" load is absorbed by the engine. One manner of addressing the possibility of an over-running clutch in a detected very light load situation is thus to establish, at least initially, a flatter, more gentle control curve during the MODULATION MODE than would otherwise be provided. Further discussion of how this is accomplished with the present invention will be provided hereinafter.

As is apparent from FIGS. 3A, 3B and 3C, and as will be readily understood by those skilled in the art, and as is discussed and described in U.S. Pat. No. 6,267,189, the PTO clutch control system can repeatedly set a new, updated desired acceleration as it passes through step 94. As is evident from a study of FIGS. 3A, 3B and 3C, so long as the speeds of input shaft 19 and output shaft 32 remain different (as determined in step 78), the control system program repeatedly cycles through step 94. In embodiments in which the desired acceleration is recalculated each time the PTO clutch control system cycles through step 94 (instead of only the first time), the desired acceleration may be repeatedly calculated by dividing the current speed of shaft 19, or another quantity related to engine speed, by the desired time of engagement, which is preferably, partly for convenience of discussion, 1.8–2.0 seconds in various of the embodiments and related figures described and discussed herein. Although in alternate embodiments the frequency of recalculation may vary (or the recalculation may occur at a frequency less than the frequency at which the control system program cycles through step 94), it has been found desirable to have the desired acceleration recalculated at the same frequency as the control system program cycles through step 94, which (as stated above) is approximately 10 ms. Such recalculation occurs with sufficient rapidity that the desired acceleration is effectively continuously recalculated to reflect changes in the speed of input shaft 19 (that is, changes in engine speed).

Figure 8:
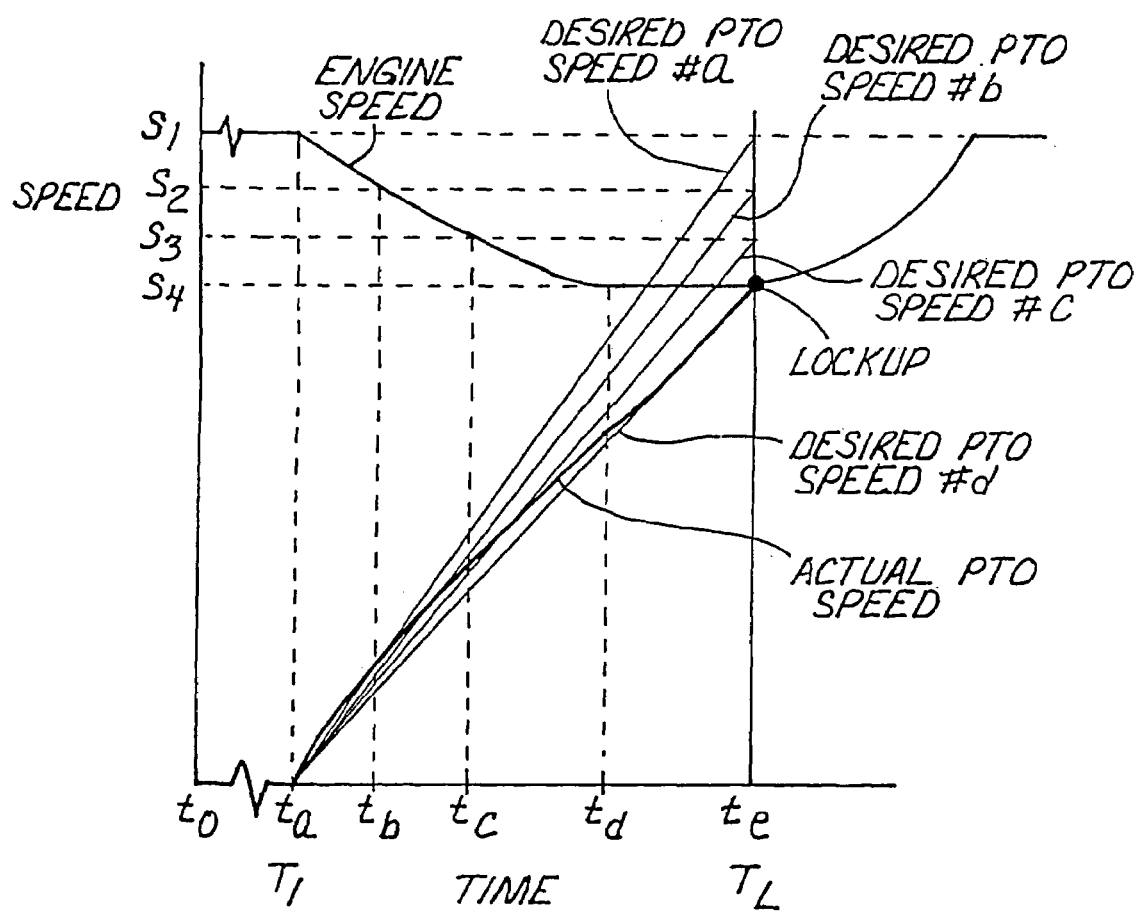
FIG. 8 is a graphical representation of actual and desired speeds of a PTO and engine speed of an agricultural vehicle during engagement of the PTO.

Referring to FIG. 8, examples of the desired and actual speeds for output shaft 32 (i.e., PTO speed), and engine speed (i.e., the speed of input shaft 19), as measured or determined by the PTO clutch control system of an embodiment that recalculates the current desired acceleration during the engagement operation, are plotted against time. Four desired speed curves are shown. The four speed curves are determined based upon the engine speed (or speed of input shaft 19) as measured at four times, $t_a$, $t_b$, $t_c$, and $t_d$ and are labeled as, and referred to below as, respectively, the "desired PTO speed #a", "desired PTO speed #b", "desired PTO speed #c" and "desired PTO speed #d" curves. For convenience, only four desired speed curves are shown in FIG. 8. As discussed above, the desired accelerations in the present embodiment are actually recalculated approximately every 10 ms (effectively continuously), and so FIG. 8 is meant to be a symbolic description of the actual operation of the PTO clutch control system, in which there are many more than four desired speed curves. Also, it is for generality that the four desired speed curves are shown as being calculated at four times (times $t_a$–$t_d$) that are not equidistant from one another. Although alternative embodiments may vary, it has been found desirable to have the desired accelerations (in contrast to FIG. 8) recalculated at a constant frequency as the PTO clutch control system repeatedly cycles through step 94.

Although, for convenience of discussion, the speed curves are shown as being calculated based upon the same time period (from $t_a$ to $t_e$), it should be understood and appreciated that the speed curves could be based upon different periods, and that the basic principle relating to recalculation would still be applicable, and that the particular time periods used for the speed curve calculations may be varied and dependent upon various factors, including such factors as the time t of calculation or load type, for example.

As is depicted in FIG. 8, output shaft 32 begins to rotate at time $t_a$, and the speed of the output shaft equals the speed of input shaft 19 (or the engine speed) at time $t_e$ (lock-up), which corresponds to $T_L$ of FIG. 4. Also, as shown, the speed of input shaft 19 (and of engine 14) does not remain constant as power begins to be transferred to output shaft 32, but, instead, decreases or droops. Consequently if the actual speed of output shaft 32 were to increase in accordance with the desired PTO speed #a curve, which is determined based upon the initial engine speed at time $t_a$, the shaft would attain the speed of input shaft 19 (i.e., the engine speed) in a time significantly shorter than the desired time of engagement (the time interval between times $t_a$ and $t_e$, i.e., 2 seconds). Instead of attaining the speed of input shaft 19 at time $t_e$, the shaft would attain the speed of the input shaft at the time at which, as shown in FIG. 8, the desired PTO speed #a curve crosses the engine speed curve.

The embodiments that repeatedly recalculate the desired acceleration avoid this excessive engagement rate by adjusting the desired speed curve as engine speed decreases. As shown in FIG. 8, at times $t_b$, $t_c$, and $t_d$ the desired acceleration is recalculated (at step 94 of the control system program) and the desired speed curve changes, respectively, to the desired PTO speed #b, desired PTO speed #c, and desired PTO speed #d curves. As described below, with such embodiments the actual acceleration of output shaft 32 is adjusted as the desired speed curve changes (more specifically, the actual acceleration is adjusted based upon the difference between the actual and desired accelerations). Insofar as the actual acceleration of output shaft 32 is adjusted to reflect the new desired speed curves, the output shaft speed increases at a rate such that it will approach the speed of input shaft 19 (i.e., the engine speed) at approximately $t_e$ (i.e., within the desired time of engagement, i.e., 2 seconds), as shown in FIG. 8, and not substantially before $t_e$.

Figure 9:
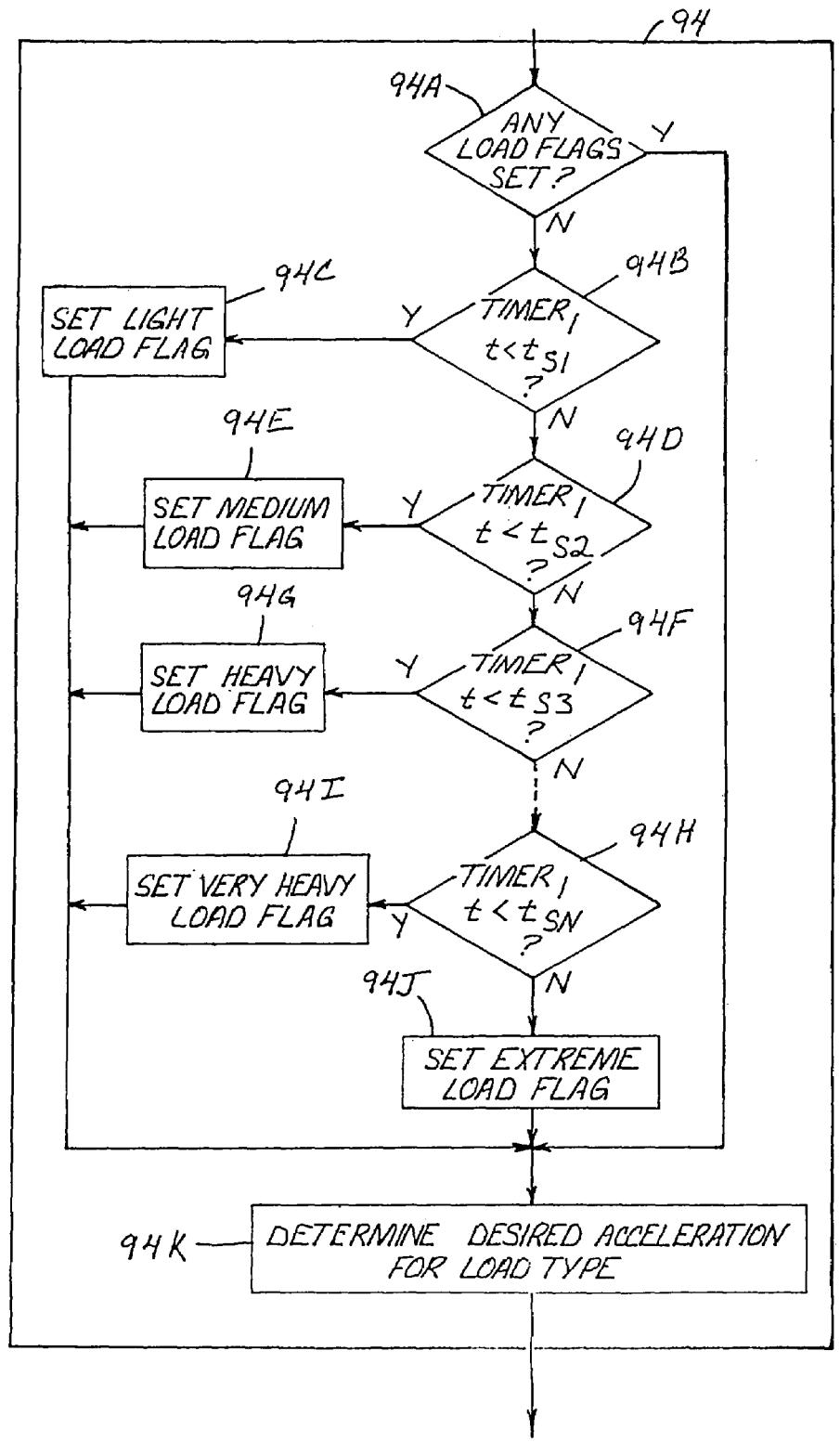
FIG. 9 is a flowchart representative of one embodiment of the functionality of step 94 of the flowchart of FIG. 3B.

From all of the foregoing, it will be appreciated that it is advantageous to be able to utilize different acceleration control curves depending upon the type of load that the PTO is driving. FIG. 9 is a flowchart depicting in greater detail one manner in which this can be accomplished at step 94 in the engagement operation process, not only for very light loads and over-running clutches, but also for other types of loads such as may be establishable, particularly through the use of or in association with the application of current shocks during the FILL MODE.

During MODULATION MODE, controller 20, upon reaching step 94, will, at step 94A, check to determine if any load flags have already been set, such as the VERY LIGHT LOAD status flag set at step 122. If so, controller 20 proceeds to step 94K; if not, it will proceed instead to step 94B.

At step 94B, controller 20 checks whether the saved TIMER1 value is less than $t_{S1}$, the time at which the first current shock was to be applied. If so, the output shaft 32 commenced movement before the scheduled time for the first current shock, as a consequence of which the load is therefore classified as or considered to be a light load, and controller 20 proceeds to step 94C, where it sets a LIGHT LOAD flag before proceeding to step 94K.

If, at step 94B, the saved TIMER1 value is not less than $t_{S1}$, controller 20 proceeds to step 94D, where it checks whether the TIMER1 value is less than $t_{S2}$, the time at which the second current shock was to be applied. If so, the output shaft 32 commenced movement after the scheduled time for the first current shock but before the scheduled time for the second current shock, as a consequence of which the load is therefore classified as or considered to be a medium load, and controller 20 proceeds to step 94E, where it sets a MEDIUM LOAD flag before proceeding to step 94K.

If, at step 94D, the saved TIMER1 value is not less than $t_{S2}$, controller 20 proceeds to step 94F, where it checks whether the TIMER1 value is less than $t_{S3}$, the time at which the third current shock was to be applied. If so, the output shaft 32 commenced movement after the scheduled time for the second current shock but before the scheduled time for the third current shock, as a consequence of which the load is therefore classified as or considered to be a heavy load, and controller 20 proceeds to step 94G, where it sets a HEAVY LOAD flag before proceeding to step 94K.

If, at step 94F, the TIMER1 value is not less than $t_{S3}$, controller 20 can proceed to other steps such as step 94H, if the system is designed to categorize additional load types, or, if no additional load types are to be categorized with a particular system, to step 94K. At step 94H, controller 20 checks whether the TIMER1 value is less than $t_{SN}$, the time at which the Nth current shock was applied. If so, the output shaft 32 commenced movement after the scheduled time for the (N−1)th current shock but before the scheduled time for the Nth current shock, as a consequence of which the load is therefore classified as or considered to be, for example, a very heavy load, and controller 20 proceeds to step 94I, where it sets a VERY HEABY LOAD flag before proceeding to step 94K.

If, at step 94H, the TIMER1 value is not less than $t_{SN}$, the load is classified as or considered to be, for example, an extreme load, and controller 20 proceeds to step 94J, where its sets an EXTREME LOAD flag before proceeding to step 94K.

Upon reaching step 94K, controller 20 then determines the desired acceleration for the load type being driven, such as in the manners previously described relative to step 94 of FIG. 3B or by alternative manners, before proceeding to step 96 of FIG. 3B. Such alternative manners, by way of example, could include the use of a preset curve for one or more load types or control curves included within look-up tables, as well as control curves determined or established by various means in real-time.

At step 96, controller 20 checks to determine whether the output shaft acceleration is less than the desired acceleration that was set at step 94. In order to perform such check, the then-current shaft acceleration must be first calculated, such as based upon the speed of shaft 32 available from circuit 56 at that time and the speed of shaft 32 as monitored during the previous loop and stored in memory, such as at step 76. If an operational loop through step 96 is executed every 10 ms, the shaft acceleration is then the change in shaft speed between program loops divided by 10 ms.

If, at step 96, the actual calculated acceleration of shaft 32 is less than the desired shaft acceleration as set at step 94, operation proceeds to step 98. On the other hand, if the actual calculated acceleration of shaft 32 is greater than or equal to the desired shaft acceleration as set at step 94, operation proceeds to step 99, instead, where the current is limited, before proceeding to step 100.

If the actual acceleration of output shaft 32 is less than the desired shaft acceleration and operation has proceeded to step 98, controller 20 then operates to increase the magnitude of the current. The particular manner in which current magnitude changes may vary for different control system embodiments.

At step 98, a first control system embodiment (here referred to as the "unmodified PTO clutch control system embodiment") may, whenever the desired acceleration exceeds the actual acceleration, increase the current magnitude by 0.1%.

An alternate second control system embodiment (here referred to as the "modified PTO clutch control system embodiment") may employ a proportional (more accurately, pseudo-proportional) adjustment algorithm to determine the increase in current. In accordance with such an algorithm, the control system may operate (a) if the actual acceleration of the PTO is determined to be less than the desired acceleration but greater than two-thirds of the desired acceleration, to apply current so as to increase the torque transmitted by the PTO clutch at a slow rate; (b) if the actual acceleration of the PTO is determined to be less than two-thirds of the desired acceleration but greater than one-third of the desired acceleration, to apply current so as to increase the torque transmitted at a medium rate; and (c) if the actual acceleration of the PTO is determined to be less than one-third of the desired acceleration, to apply current so as to increase the torque transmitted at a fast rate.

Figure 7:
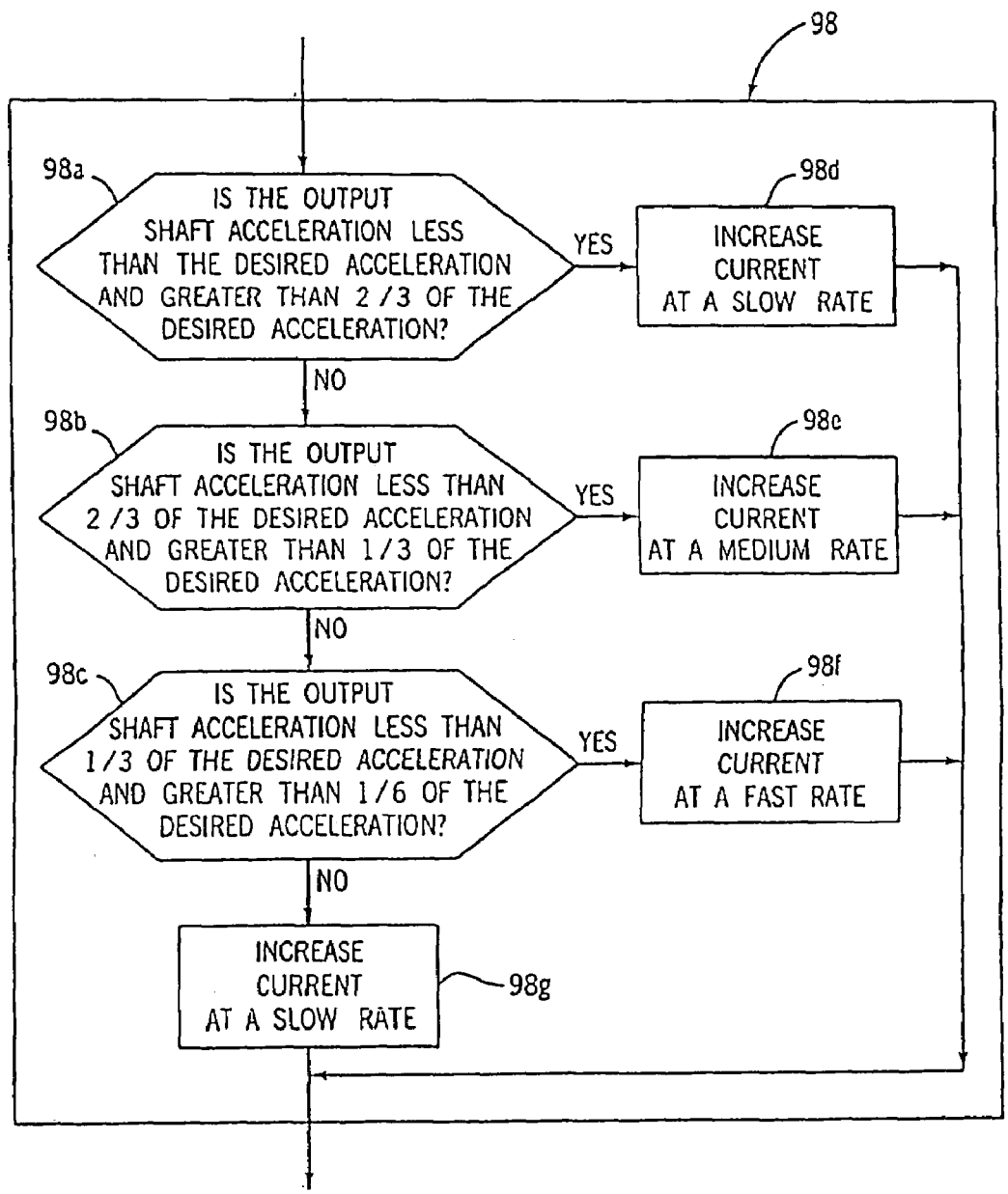
FIG. 7 is a flowchart representative of one embodiment of the functionality of step 98 of the flowchart of FIG. 3B.

A third control system embodiment (here referred to as the "modified proportional adjustment algorithm PTO clutch control system embodiment") has also been found to be practical and useful. FIG. 7 is a flowchart depicting the operational flow of one embodiment of the functionality of step 98 of the flowchart of FIG. 3B for a modified proportional adjustment algorithm PTO clutch control system embodiment. At step 98a, controller 20 determines if the actual acceleration is between the desired acceleration and two-thirds of the desired acceleration. If so, the program increases the current magnitude at a slow rate in step 98d before exiting step 98. If not, controller 20 proceeds to step 98b, at which it determines whether the actual acceleration is between two-thirds of the desired acceleration and one-third of the desired acceleration. If so, controller 20 increases the current magnitude at a medium rate in step 98e. If not, controller 20 proceeds to step 98c, at which it determines whether the actual acceleration is between one-third of the desired acceleration and one-sixth of the desired acceleration. If so, controller 20 increases the current magnitude at a fast rate in step 98f. If not, the actual acceleration is between zero and one-sixth of the desired acceleration, and controller 20 proceeds to step 98g at which it increases the current magnitude at a slow rate. (It should be noted that the program may be designed to treat actual accelerations that exactly equal two-thirds, one-third, or one-sixth of the desired acceleration as if the actual accelerations were above or below these levels.)

A significant characteristic of the modified proportional adjustment algorithm is that the modified proportional adjustment algorithm (a) determines whether the actual acceleration is below a minimum threshold proportion of the desired acceleration, and (b) increases the current magnitude at a slow rate if the actual acceleration is below the minimum threshold proportion even though the actual acceleration is significantly less than the desired acceleration. That is, in such an embodiment, the modified proportional adjustment algorithm determines in step 98c whether the actual acceleration is below one-sixth of the desired acceleration and, if so, increases the current magnitude at a slow rate in step 98g.

This feature of the modified proportional adjustment algorithm alleviates problems such as are described in U.S. Pat. No. 6,267,189 that are associated with possible spurious rotations of output shaft 32 due to premature delivery of torque by PTO clutch 18 (before the clutch is fully engaged) that may occur, for example, before over-running clutch 87 is locked. This is because, typically, once PTO clutch 18 is engaged and output shaft 32 is being accelerated, the output shaft would not have an actual acceleration less than one-sixth of the desired acceleration. Further, typically, PTO clutch 18 is not capable of delivering sufficient torque when the clutch is not fully engaged so as to cause output shaft 32 to accelerate at a rate greater than one-sixth of any of the desired accelerations that may be calculated by control system 10. Therefore, the modified proportional adjustment algorithm fulfills the two goals of (a) causing the current magnitude to increase at a fast rate when the actual acceleration of output shaft 32 is significantly less than the desired acceleration and yet (b) not causing the current magnitude to increase at a fast rate when PTO clutch 18 is still not fully engaged.

While, in such an embodiment, the ratios of actual acceleration to desired acceleration that determine the current magnitude increase rates are preferably set at two-thirds, one-third, and one-sixth, in alternate embodiments the ratios may be set at different levels. Indeed, different PTO clutch control systems may have a variety of different proportional adjustment algorithms that distinguish among more (or less) than four ranges (of ratios of actual acceleration to desired acceleration) and in which the control systems provide finer (or less fine) gradations of increases in the current magnitude. (Fully proportional control may also be appropriate in certain embodiments.) Also, the exact values for the "slow", "medium", and "fast" rates of current increase may vary depending upon the embodiment, although the "fast" rate of increase will typically be the fastest rate at which the mechanical clutch can predictably increase torque in response to commands from the control system to increase pressure. It should be noted that, while such an embodiment of the invention combines both the functionality of the modified proportional adjustment algorithm and the above-described repeated (continuous) recalculation of the desired acceleration (and modification of the desired speed curve), the modified proportional adjustment algorithm of step 98 may be employed even when the desired acceleration is only calculated once.

Although the foregoing discussion of steps 96 and 98 has focused on embodiments that make use of increases in current magnitude in engagement operations, embodiments that make use of increases in pulse width may also be employed. With such embodiments, if, at step 96, the actual acceleration of output shaft 32 is determined to be greater than or equal to the desired acceleration, the controller 20 proceeds to step 100, leaving the pulse width value unchanged. If, at step 96, the actual acceleration of output shaft 32 is determined to be less than the desired acceleration, the controller 20 proceeds instead to step 98, at which it operates to increase the current pulse width by 0.1%.

In certain of such systems, it may be desirable to reduce the pulse width value when the actual acceleration of output shaft 32 is greater than the desired acceleration. However, this type of control may cause hunting, and thus an acceleration of shaft 32 which is not smooth. Accordingly, in the presently preferred embodiments that utilize pulse width modulation techniques, it is considered preferable to leave the pulse width value unchanged when the actual acceleration of shaft 32 exceeds the desired acceleration. With such embodiments, a pulse width increase of 0.1% for each 10 ms interval (i.e., for each pass through step 98) has been found to be advantageous and preferable.

Any of these control system embodiments (or the programming contained therein) may be advantageously employed in conjunction with the control system described above in which the desired accelerations are repeatedly recalculated (i.e., such that the desired speed curve changes with engine speed).

Regardless of the particular embodiment, when the engagement operation reaches step 100 from either step 98 or step 99, controller 20 checks whether the increased current value, as set at steps 98, 99, or 102, exceeds the maximum allowable current value. If so, controller 20 proceeds to step 101 and resets the current value to the maximum allowable value before proceeding through point A of FIGS. 3B and 3A to step 104 of FIG. 3A; if not controller 20 proceeds directly through point A of FIGS. 3B and 3A to step 104 of FIG. 3A.

Operation then proceeds in the manner previously described commencing at step 104 and continues in a MODULATION MODE operational loop until, at step 78 of FIG. 3B, the speeds are detected as being the same. At that time, MODULATION MODE ceases and RAMP MODE commences.

Operation then proceeds from step 78 to step 80, instead of to step 82, and at step 80 controller 20 then resets the timer count and also sets a STEADY STATE flag before proceeding to step 102. At step 102 controller 20 determines a current value to be applied, which, during RAMP MODE, may include incremental increases to the current value, such as by increasing the current magnitude by 1.00% (or, in alternative embodiments, increasing the pulse width value by 1.00%), before proceeding to step 100.

Upon completion of step 102, controller 20 proceeds to step 100, and operation continues therethrough and thereafter as previously described, with continuing operational looping through steps 80 and 102 of the RAMP MODE loop.

After the maximum current value is reached (at $T_{max}$) in continuing passes through step 102, RAMP MODE is completed, and steps 100 and 101 act to limit the current value to the maximum current valve.

If, in operational passes after the STEADY STATE flag has been set at step 80, speeds are subsequently found to (again) be different at step 78, controller 20 proceeds to step 82, where it checks to see if the STEADY STATE flag is set. Since the flag has previously been set, controller 20 proceeds to step 83.

At step 83, controller 20 determines whether or not the speed difference between shaft 19 (or engine 14) and shaft 32 is greater than some allowable deviation value, such as fifteen percent (15%). If the speed difference is greater than fifteen percent (15%), operation proceeds to step 85, which is indicative of a fault condition and results in termination of PTO operation. If the speed difference is less than 15%, controller 20 proceeds instead to step 102, from which point the operation will proceed as previously described. Typically, if the STEADY STATE flag has previously been set and step 102 is reached from step 83, the determined current value will be set at or near to the maximum allowable current value.

Figure 5:
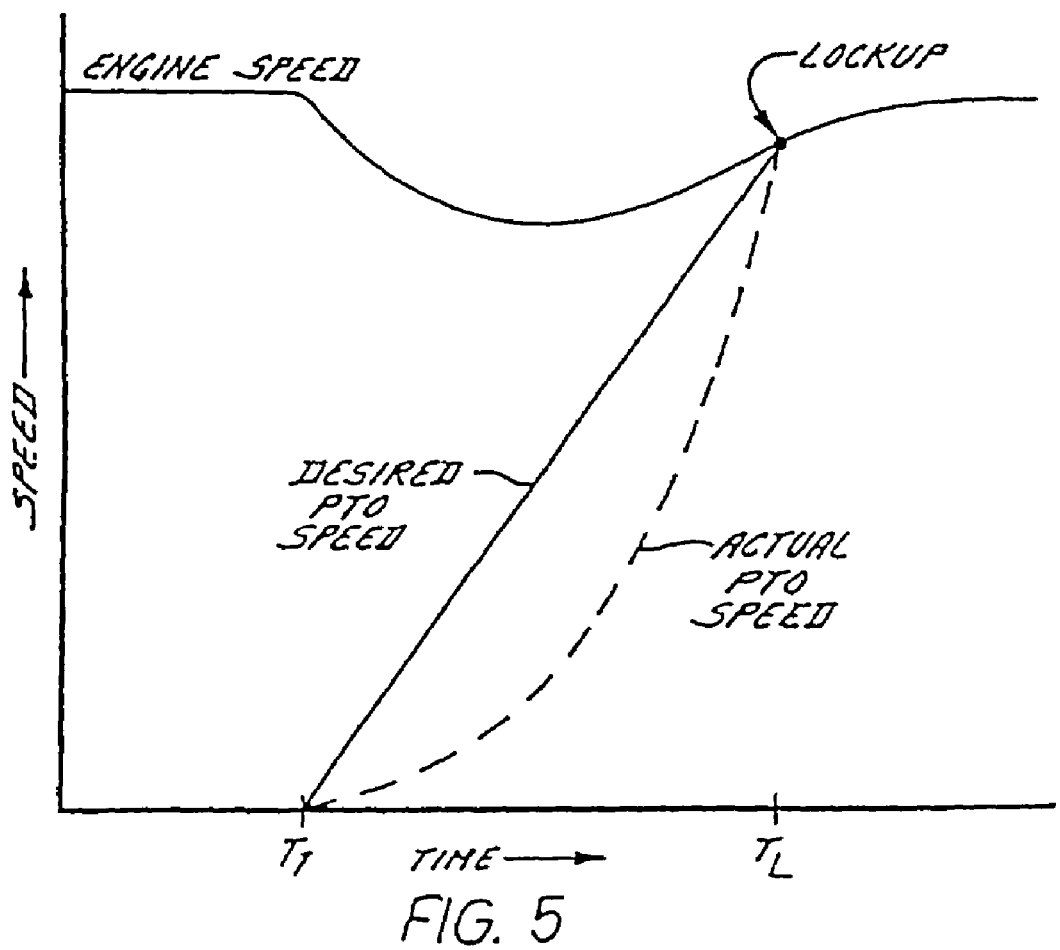
FIG. 5 is a graphical representation of actual and desired accelerations of a PTO shaft.

Referring now to FIGS. 4 and 5 relative to the foregoing discussion, it should be observed that PTO clutch lockup occurs at time $T_L$ when the speeds of input shaft 19 (or engine 14) and output shaft 32 become equal or proportional, as detected at step 78 of FIG. 3B. Following such occurrence, so long as the speeds remain the same, operation sequence controller 20 repeatedly proceeds through steps 102 and 100, increasing the current value with each pass through step 102, until the current value exceeds the maximum allowable current. At that point, and in subsequent passes through step 100, the current value is reset to the maximum allowable current value at step 101. Such actions cause the current value to be ramped up over time to produce a clutch pressure in PTO clutch 18 associated with the maximum allowable torque to be transmitted between input shaft 19 and output shaft 32. If the current value ever becomes greater than the maximum allowable current value, the current value is reset to the maximum allowable current value at step 101.

For embodiments that utilize PWM techniques, following lockup at time $T_L$ controller 20 proceeds through steps 100 and 102 to ramp up the pulse width value to produce a clutch pressure in clutch 18 associated with the maximum torque to be transmitted between shafts 32 and 19. In step 100, the current pulse width value is compared with the maximum pulse width value. If the current pulse width value set at steps 98, 99, or 102 is greater than the maximum pulse width value, controller 20 resets the pulse width value to the maximum pulse width value at step 101.

It should be recalled from discussions hereinabove that differing time limits may be established or utilized for different modes of the operation and that the timer is updated at step 109 of FIG. 3A as the looping operations proceed, as a consequence of which detection of a timing out of the timer at step 104 by the controller 20 may occur under several different circumstances.

In such regard, it should be recalled that one manner of reaching step 104 is through on operational loop including step 90. At step 90 the fill current value is set when output shaft 32 is detected as not moving at step 88. If, after operational looping during FILL MODE for a certain time, the output shaft 32 has not yet begun moving, controller 20 thus operates at step 104 to terminate the PTO operation.

Another manner in which step 104 can be reached is through an operational loop including steps 94, 96, and 98 or 99. If, after commencement of MODULATION MODE, the speeds of the input shaft 19 and the output shaft are not found to be the same at step 78 within a given time, lockup of the clutch has not occurred within that time, and controller 20 again operates at step 104 to terminate the PTO operation.

A further manner in which step 104 can be reached is through an operational loop including step 102. During RAMP MODE, so long as the speeds of the input and output shafts are the same, the timer is reset upon each passage through step 80. If the speeds differ at some point, however, operation will proceed through step 82 to step 83, instead of to step 80, and the timer will not be reset at step 80 in that loop. In continuing passes through a loop that includes step 83 instead of step 80, the timer will be repeatedly updated at step 109 (FIG. 3A) until either (a) the speeds are again found to be the same at step 78, and the timer is reset at step 80, or (b) the time limit for again achieving the same speeds is reached at step 104 (with such condition typically being indicative of undesirable slippage in the PTO clutch 18), resulting in termination of the PTO operation at step 107, or (c) detection of a fault condition at step 83, resulting in termination of the PTO operation at step 85.

In addition to the various checks performed and conditions tested, as discussed and described in the foregoing, additional checks and tests may be desirable with various systems, including, by way of example, periodic tests of engine speed and other operational factors or considerations, and the outcomes of such tests may be utilized in determining the course of operations without departing from the spirit and scope of the present invention.

Although various features of the control system are described and illustrated in the drawings, the present invention is not necessarily limited to these features and may encompass other features disclosed both individually and in various combinations. For example, developments in PTO clutches may make electric clutches cost effective for PTO applications. Accordingly, hydraulic clutch 18 and control valve 28 may potentially be replaced with an associated electric clutch and electric clutch control circuit.

It will be understood that changes in the details, materials, steps, and arrangements of parts which have been described and illustrated to explain the nature of the invention will occur to and may be made by those skilled in the art upon a reading of this disclosure within the principles and scope of the invention. The foregoing description illustrates the preferred embodiment of the invention; however, concepts, as based upon the description, may be employed in other embodiments without departing from the scope of the inven-

What is claimed is:

1. In a system for controlling operation of a clutch engageable for connecting a PTO of a vehicle in rotatably driven relation to a rotating power source of the vehicle, the clutch including an input coupled to the power source and an output coupled to the PTO, the system comprising a controller for controlling an engagement pressure of the clutch, wherein the clutch will transmit a maximum torque between the input and output in response to a maximum clutch engagement pressure as controlled by the controller and will transmit a range of torque values between zero and the maximum torque in response to a range of clutch engagement pressures less than the maximum clutch engagement pressure, the system including sensors for sensing a rotational speed representative of a rotational speed of the power source and of a rotational speed of the output, respectively, and outputting speed signals representative of the sensed speeds to a processor of the controller operable for storing and retrieving information in a memory and outputting control signals to the clutch for controlling the clutch engagement pressure responsive to the speed signals and information contained in the memory, an improved method of engaging the clutch comprising the step of:
 (a) determining a starting control signal value for controlling the clutch engagement pressure based at least in part on information stored in the memory relating to when the clutch first began to carry torque during at least one prior engagement of the clutch;
 (b) determining an initial rotational speed of the power source under a zero torque transmission condition of the clutch; and
 (c) sensing rotational speeds representative of the speed of the power source and of the output, respectively, as the control signal value is increased from the starting value and comparing the sensed rotational speeds representative of the speed of the power source with the initial rotational speed of the power source, and storing information representative of the control signal value in the memory for use in step (a) for a subsequent engagement of the clutch, when a first of the following conditions occurs:
 (i) the sensed speed representative of the speed of the power source is more than a predetermined amount less than the initial rotational speed, and
 (ii) the PTO output begins to rotate.

2. In the system of claim 1, the improvement comprising a further step of:
 (d) altering a rate of increase of the clutch engagement pressure responsive to the information stored in the memory in step (c).

3. In the system of claim 2, the improvement further comprising in step (d), altering the rate of increase of the clutch engagement pressure by decreasing the rate.

4. In the system of claim 2, the improvement further comprising in step (d), altering the rate of increase of the clutch engagement pressure by increasing the rate.

5. In the system of claim 1, the improvement further comprising in step (a) determining the starting control signal value for controlling the clutch engagement pressure based at least in part on information stored in the memory in step (c) during a plurality of previous engagements of the clutch.

6. In the system of claim 5, the improvement comprising in step (a) determining the starting control signal value for controlling the clutch engagement pressure based at least in part on an average of control signal values stored in memory in step (c).

7. In the system of claim 1, the improvement comprising in step (c)(i), the predetermined amount less than the initial rotational speed representing a droop condition of the power source.

8. A system for controlling operation of a clutch engageable for connecting a PTO of a vehicle in rotatably driven relation to a rotating power source of the vehicle, the clutch including an input coupled to the power source and an output coupled to the PTO, the system comprising:
 a controller for controlling an engagement pressure of the clutch, including a processor operable for storing and retrieving information in a memory and outputting control signals to the clutch for controlling the clutch engagement pressure responsive to a collection of speed signals and information contained in the memory, wherein the clutch will transmit a maximum torque between the input and output in response to a maximum clutch engagement pressure as controlled by the control, and the clutch will transmit a range of torque values between zero and the maximum torque in response to a range of clutch engagement pressures less than the maximum clutch engagement pressure and conditions including a load condition on the PTO;
 a sensor for sensing a rotational speed representative of a rotational speed of the power source and outputting a speed signal representative thereof to the controller; and
 a sensor for sensing a rotational speed of the output and outputting a speed signal representative thereof to the controller;
 wherein after the clutch has been previously engaged at least once, the processor will determine a value for a starting control signal for controlling a starting clutch engagement pressure based at least in part on information representative of a previous condition of the clutch stored in the memory.

9. The system of claim 8, wherein the information representative of the previous condition includes information relating to at least one control signal value when the clutch began to carry torque during at least one previous engagement.

10. The system of claim 9, wherein the information relating to the at least one control signal value when the clutch began to carry torque, comprises a time value for when the clutch began to carry torque.

11. The system of claim 9, wherein the information relating to the at least one control signal value when the clutch began to carry torque, comprises an average of the control signal values for when the clutch began to carry torque during a plurality of previous engagements.

12. The system of claim 9, wherein the information relating to the at least one control signal value when the clutch began to carry torque, comprises the control signal value for when the clutch began to carry torque during an immediately preceding engagement.

13. In a system for controlling operation of a clutch engageable for connecting a PTO of a vehicle in rotatably driven relation to a rotating power source of the vehicle, including a controller for controlling an engagement pressure of the clutch including a processor operable for storing and retrieving information in a memory and outputting control signals to the clutch for controlling the clutch engagement pressure responsive to the speed signals and information contained in the memory, the clutch including an input coupled to the power source and an output coupled to the PTO, wherein the clutch will transmit a maximum torque between the input and output in response to a maximum clutch engagement pressure as controlled by the controller, and the clutch will transmit a range of torque values between zero and the maximum torque in response to a range of clutch engagement pressures less than the maximum clutch engagement pressure and a load condition on the PTO, the system including sensors for sensing a rotational speed representative of a rotational speed of the power source and of a rotational speed of the output, respectively, and outputting speed signals representative of the sensed speeds to the controller, an improved method of operation of the clutch comprising the steps of:

(a) commencing to increase the clutch engagement pressure from a starting value determined based on calibration information stored in the memory;

(b) determining an initial rotational speed of the power source under a zero torque transmission condition of the clutch; and (c) sensing rotational speeds representative of the speed of the power source and of the output as the clutch engagement pressure is increased from the starting value, and storing in the memory information representative of occurrence of a first of the following conditions:
  (i) sensing a speed representative of the speed of the power source which is more than a predetermined amount less than the initial speed; and
  (ii) sensing rotation of the PTO output.

14. In the system of claim 13, the improvement further comprising the step of:

(d) determining new calibration information based at least in part on the information stored in the memory in step (c).

15. In the system of claim 14, the improvement further comprising in step (d) determining the new calibration information based at least in part on information stored in the memory in step (c) during a plurality of previous engagements.

16. In the system of claim 15, the improvement comprising in step (d) determining the new calibration information based at least in part on an average of values of the information stored in the memory in step (c) during the plurality of previous engagements.

17. In the system of claim 16, the improvement comprising in step (d) determining the new calibration information based at least in part on an average of values of the information stored in the memory in step (c) during four previous engagements.

18. In the system of claim 14, the improvement comprising in step (d) determining the new calibration information based at least in part on an average of a plurality of previously determined values if a value relating to the information stored in the memory in step (c) is within a predetermined range of the predetermined values, and determining the new calibration information based only on the information stored in the memory in step (c) if the information stored in the memory in step (c) is beyond the predetermined range of values.

19. In the system of claim 13, the improvement comprising in step (c)(i), the predetermined amount less than the initial speed representing a droop condition of the power source.

* * * * *